United States Patent
Narayanaswamy et al.

(10) Patent No.: US 11,451,587 B2
(45) Date of Patent: *Sep. 20, 2022

(54) DE NOVO SENSITIVITY METADATA GENERATION FOR CLOUD SECURITY

(71) Applicant: Netskope, Inc., Santa Clara, CA (US)

(72) Inventors: Krishna Narayanaswamy, Saratoga, CA (US); Ajay Agrawal, Bangalore (IN)

(73) Assignee: Netskope, Inc., Santa Clara, CA (US)

( * ) Notice: Subject to any disclaimer, the term of this patent is extended or adjusted under 35 U.S.C. 154(b) by 361 days.

This patent is subject to a terminal disclaimer.

(21) Appl. No.: 16/737,759

(22) Filed: Jan. 8, 2020

(65) Prior Publication Data

US 2020/0145463 A1 May 7, 2020

Related U.S. Application Data

(63) Continuation of application No. 16/408,215, filed on May 9, 2019, which is a continuation-in-part of (Continued)

(51) Int. Cl.
*H04L 9/40* (2022.01)
*G06F 16/951* (2019.01)
(Continued)

(52) U.S. Cl.
CPC ............ *H04L 63/20* (2013.01); *G06F 16/285* (2019.01); *G06F 16/951* (2019.01);
(Continued)

(58) Field of Classification Search
None
See application file for complete search history.

(56) References Cited

U.S. PATENT DOCUMENTS 7,996,373 B1 * 8/2011 Zoppas ................. G06F 21/554
707/694
8,365,243 B1 1/2013 Lu et al.
(Continued)

FOREIGN PATENT DOCUMENTS

JP 2012084141 A 4/2012
JP 2015130112 A 7/2015
(Continued)

OTHER PUBLICATIONS

"Netskope Introspection," netSkope, Inc., 2015, 3 pgs.
(Continued)

*Primary Examiner* — Kaveh Abrishamkar
(74) *Attorney, Agent, or Firm* — Haynes Beffel & Wolfeld, LLP; Ernest J. Beffel, Jr.

(57) ABSTRACT

The technology disclosed presents an improved endpoint data loss prevention (DLP) solution, referred to herein as "small-footprint endpoint DLP (sf-EDLP)," which enforces security policies at endpoints by relying on previously generated sensitivity metadata, rather than by performing content sensitivity scans at the endpoints. Since content sensitivity scans are computationally intensive and time consuming, sf-EDLP leads to a significantly simpler implementation, reduced runtime computation, and a smaller memory footprint; making it suitable for computationally constrained environments such as modern mobile devices.

20 Claims, 9 Drawing Sheets

Related U.S. Application Data application No. 16/000,132, filed on Jun. 5, 2018, now Pat. No. 10,291,657, which is a continuation of application No. 15/368,240, filed on Dec. 2, 2016, now Pat. No. 10,826,940, and a continuation of application No. 15/368,246, filed on Dec. 2, 2016, now Pat. No. 11,019,101.

(60) Provisional application No. 62/675,692, filed on May 23, 2018, provisional application No. 62/307,305, filed on Mar. 11, 2016.

(51) Int. Cl.
| | |
|---|---|
| G06F 16/28 | (2019.01) |
| G06F 21/62 | (2013.01) |
| G06F 16/17 | (2019.01) |

(52) U.S. Cl.
CPC ...... *G06F 21/6209* (2013.01); *H04L 63/0281* (2013.01); *H04L 63/10* (2013.01); *H04L 63/104* (2013.01); *H04L 63/105* (2013.01); *H04L 63/12* (2013.01); *G06F 16/1734* (2019.01)

(56) References Cited

U.S. PATENT DOCUMENTS

| | | | |
|---|---|---|---|
| 8,438,630 B1* | 5/2013 | Clifford | G06F 21/60 |
| | | | 713/168 |
| 8,544,060 B1 | 9/2013 | Khetawat | |
| 8,572,758 B1 | 10/2013 | Clifford | |
| 8,613,040 B2 | 12/2013 | Barile | |
| 8,613,070 B1 | 12/2013 | Borzycki et al. | |
| 8,763,072 B2 | 6/2014 | Agrawal | |
| 8,819,772 B2 | 8/2014 | Bettini et al. | |
| 8,914,892 B2 | 12/2014 | Karande et al. | |
| 9,171,008 B2 | 10/2015 | Prahlad et al. | |
| 9,230,096 B2 | 1/2016 | Sarin et al. | |
| 9,246,948 B2 | 1/2016 | Jaiswal et al. | |
| 9,256,727 B1 | 2/2016 | Manmohan | |
| 9,418,232 B1 | 8/2016 | Khetawat et al. | |
| 9,613,190 B2 | 4/2017 | Ford et al. | |
| 9,626,528 B2 | 4/2017 | Butler | |
| 9,692,759 B1 | 6/2017 | Chandrasekhar | |
| 10,235,520 B2 | 3/2019 | Bae | |
| 10,248,797 B1 | 4/2019 | Shinde et al. | |
| 10,291,657 B2* | 5/2019 | Narayanaswamy | |
| | | | G06F 21/6209 |
| 10,594,730 B1* | 3/2020 | Summers | H04L 63/0892 |
| 10,812,531 B2* | 10/2020 | Narayanaswamy | .. G06F 16/285 |
| 10,826,940 B2* | 11/2020 | Narayanaswamy | |
| | | | H04L 63/0281 |
| 11,019,101 B2* | 5/2021 | Narayanaswamy | .. H04L 63/105 |
| 11,064,013 B2* | 7/2021 | Cheng | G06F 9/547 |
| 2005/0289354 A1* | 12/2005 | Borthakur | H04L 63/102 |
| | | | 713/182 |
| 2008/0216174 A1* | 9/2008 | Vogel | G06F 21/6245 |
| | | | 726/22 |
| 2014/0007182 A1 | 1/2014 | Qureshi et al. | |
| 2014/0026181 A1 | 1/2014 | Kiang et al. | |
| 2015/0074744 A1 | 3/2015 | Mclean et al. | |
| 2015/0172120 A1 | 6/2015 | Dwarampudi et al. | |
| 2016/0285918 A1* | 9/2016 | Peretz | G06F 16/285 |
| 2017/0091453 A1 | 3/2017 | Cochin | |
| 2017/0093867 A1 | 3/2017 | Burns et al. | |
| 2017/0206353 A1 | 7/2017 | Jai et al. | |
| 2017/0353496 A1 | 12/2017 | Pai et al. | |
| 2018/0063182 A1* | 3/2018 | Jones | G06F 21/577 |
| 2019/0034295 A1 | 1/2019 | Bourgeois et al. | |
| 2021/0367976 A1 | 11/2021 | Khurshid et al. | |

FOREIGN PATENT DOCUMENTS

| | | |
|---|---|---|
| WO | 2005/069823 A2 | 8/2005 |
| WO | 2006137057 A2 | 12/2006 |
| WO | 2007009255 A1 | 1/2007 |
| WO | 2012058487 A2 | 5/2012 |
| WO | 2014/093613 A1 | 6/2014 |
| WO | 2019226363 A1 | 11/2019 |

OTHER PUBLICATIONS

"Data Loss Prevention and Monitoring in the Cloud" by netSkope, Inc., Nov. 2014, 18 pgs.

"Repave the Cloud-Data Breach Collision Course," netSkope, Inc., 2014, 6 pgs.

PCT/US2017/021969—International Search Report and Written Opinion dated Jun. 22, 2017, 11 pages.

Laminin Solutions: "Metadata Permissions Protects Confidential Information", Feb. 19, 2013, pp. 1-2 XP002770913.

Yague et al., "A Metadata-based access control model for web services", Computer Science Department, Internet Research, vol. 15, No. 1, University of Malaga, Malaga, Spain, Dec. 31, 2005, pp. 99-116, XP002770914.

Gowadia etal., "RDF Metadata for XML Access Control", Proceedings of the ACM Workshop on XML Security 2003. Fairfax, VA, Oct. 31, 2003, pp. 39-48, XP001198168.

Kuwabara etal., "Use of Metadata for Access Control and Version Management in RDF Database", Sep. 12, 2011, Knowledge-Based and Intelligent Information and Engineering Systems, Springer Berling Heidelberg, pp. 326-336, XP019164752.

PCT/US2017/021969—International Preliminary Reporton Patentability dated Mar. 5, 2018, 13 pages.

U.S. Appl. No. 15/368,240—Office Action dated Aug. 7, 2018, 28 pages.

U.S. Appl. No. 16/000,132—Office Action dated Oct. 2, 2018, 18 pages.

U.S. Appl. No. 15/368,240—Response to Office Action dated Aug. 7, 2018, filed Oct. 11, 2018, 25 pages.

U.S. Appl. No. 16/000,132—Response to Office Action dated Oct. 2, 2018, filed Nov. 13, 2018, 16 pages.

U.S. Appl. No. 16/000,132—Notice of Allowance dated Dec. 28, 2018, 16 pages.

U.S. Appl. No. 15/368,240—Office Action dated Feb. 8, 2019, 28 pages.

JP-20185473875—Notice of Allowance with Allowed Claims dated Mar. 25, 2019, 7 pages.

EP-17713822.9, Rule 71(3) Allowance Communication dated Mar. 8, 2019, 147 pages.

PCT/US2019/031867—International Search Reoprt and Written Opinion dated Sep. 9, 2019, 20 pages.

EP-19189235.5 Extended European Search Report dated Nov. 27, 2019, 5 pages.

U.S. Appl. No. 15/368,240—Office Action dated Dec. 26, 2019, 40 pages.

U.S. Appl. No. 15/368,246—Office Action dated Apr. 5, 2019, 40 pages.

U.S. Appl. No. 15/368,246—Response to Office Action dated Apr. 5, 2019, filed May 3, 2019, 16 pages.

U.S. Appl. No. 15/368,246—Supplemental Response to Office Action dated Apr. 5, 2019, filed Oct. 25, 2019, 8 pages.

U.S. Appl. No. 15/368,240—Response to Final Office Action dated Feb. 8, 2019 filed Apr. 19, 2019, 32 pages.

Kark et al, "Trends: Calculating the Cost of a Security Breach", Forrester Research, Inc. Apr. 10, 2007, 7 pgs.

"Data Breach: The Cloud Multiplier Effect", Ponemon Institute, Jun. 4, 2014, 27 pages.

Riley et al, "Magic Quadrant for Cloud Access Security Brokers", Nov. 30, 2017, 28 pages, downloaded from https://go.netskope.com/typ-gartner-mq-for-casb.html.

Lakshman et al, "Cassandra—A Decentralized Structured Storage System", 2009, 6 pages.

DeCandia et al, "Dynamo: Amazon's Highly Available Key-value Store", SOSP '07, Oct. 14-17, 2007, 16 pages.

(56) References Cited

OTHER PUBLICATIONS

Chang et al, "Bigtable: A Distributed Storage System for Structured Data", Operating Systems Design and Implementation, OSDI, 2006, 14 pages.
U.S. Appl. No. 15/368,246—Office Action dated Jan. 27, 2020, 20 pages.
U.S. Appl. No. 16/783,146—Office Action dated Mar. 27, 2020, 26 pages.
U.S. Appl. No. 16/783,146—Response to Office Action dated Mar. 27, 2020, filed Jun. 4, 2020, 21 pages.
U.S. Appl. No. 16/783,146—Notice of Allowance dated Jun. 17, 2020, 13 pages.
U.S. Appl. No. 15/368,240—Notice of Allowance dated Jun. 29, 2020, 22 pages.
Sumit Khurana, et al., "Performance evaluation of Virtual Machine (VM) scheduling policies in Cloud computing (spaceshared & timeshared)"; 2013 Fourth International Conference on Computing, Communications and Networking Technologies (ICCCNT); Year: Jul. 2013; pp. 1-5.
U.S. Appl. No. 16/409,685—Office Action dated Jul. 14, 2020, 28 pages.
U.S. Appl. No. 15/368,246—Notice of Allowance dated Oct. 6, 2020, 22 pages.
PCT/US2019/031867—International Prelinary Report on Patentability dated Nov. 24, 2020, 12 pages.
U.S. Appl. No. 16/409,685—Notice of Allowance dated Dec. 3, 2020, 18 pages.
U.S. Appl. No. 15/368,240—Response to Office Action dated Dec. 26, 2019, filed May 26, 2020, 12 pages.
U.S. Appl. No. 15/368,246—Response to Office Action dated Jan. 27, 2020, filed May 25, 2020, 16 pages.
U.S. Appl. No. 16/409,685—Response to Office Action dated Jul. 14, 2020, filed Oct. 14, 2020, 9 pages.
U.S. Appl. No. 16/411,039—Office Action dated Feb. 10, 2021, 13 pages.
EP 19189235.5 Rule 71(3)—Intent to Grant, dated Dec. 17, 2020, 7 pages.
EP 19189235.5 Response to Rule 71(3), dated Dec. 17, 2020, 6 pages.
JP 2019081108 First Office Action, dated May 19, 2021, 7 pages.
EP 19727564.7—Voluntary Amendments filed on Dec. 22, 2020, 5 pages.
"Netskope Cloud Confidence Index™", netSkope, Inc., 2015, 4 pages.
"The 5 Steps to Cloud Confidence", netSkope, Inc., 2014, 11 pages.
U.S. Appl. No. 16/411,039—Response to Office Action dated Feb. 10, 2021, filed Jul. 9, 2021, 18 pages.
EP 17713822.9 Decision to Grant, dated Aug. 1, 2019, 2 pages.
JP 2019-081108 Response to First Office Action dated May 18, 2021, filed Sep. 21, 2021, 13 pages.
Li et al., Security Intelligence—A Practitioner's Guide to Solving Enterprise Security Challenges, Wiley, dated 2015, 363 pages.
McAfee, McAfee Data Loss Prevention Endpoint, dated May 2017, 3 pages.
Symantec, Symantec Data Loss Prevention for Endpoint, dated May 2011, 3 pages.
Netskope, Netskope Active Cloud DLP, dated 2015, 4 pages.
"Netskope Active Cloud DLP," netSkope, Inc., 2015, 4 pgs.
Screen capture of https://www.bitglass.com/blog/how-topatent-a-phishing-attack, dated Oct. 1, 2015.
PTAB Case No. PGR2021-00091, Petition for Post-Grant Review of U.S. Pat. No. 10,855,671, *Netskope, Inc.*, Petitioner, v. *Bitglass, Inc.*, Patent Owner.
PTAB Case No. PGR2021-00092, Petition for Post-Grant Review of U.S. Pat. No. 10,855,671, *Netskope, Inc.*, Petitioner, v. *Bitglass, Inc.*, Patent Owner.
Jill Gemmill et al., Cross-domain authorization for federated virtual organizations using the myVocs collaboration environment, 21 Concurrency & Computation: Prac-Tice and Experience 509 (2008).
PTAB Case No. IPR2021-01045, Petition for Inter Partes Review of U.S. Pat. No. 10,757,090, *Netskope, Inc.*, Petitioner, v. *Bitglass, Inc.*, Patent Owner.
PTAB Case No. IPR2021-01046, Petition for Inter Partes Review of U.S. Pat. No. 10,757,090, *Netskope, Inc.*, Petitioner, v. *Bitglass, Inc.*, Patent Owner.
Cheng et al, "Cloud Security for Dummies, Netskope Special Edition" John Wiley & Sons, Inc. 2015, 53 pages.
U.S. Appl. No. 16/408,215 Preinterview First Office Action dated Sep. 23, 2021, 21 pgs.
U.S. Appl. No. 16/411,039—Office Action dated Oct. 21, 2021, 37 pages.
JP 2019-081108 Notice of Allowance, dated Oct. 26, 2021, 5 pages.
EP 19189235.5 Certificate of Grant, dated Aug. 18, 2021, 1 pages.
EP 19727564.7 Rules 161(1) and 162 Communication, dated Jan. 15, 2021, 3 pages.
EP 19727564.7 Response to Rules 161(1) and 162 Communication dated Jan. 15, 2021, filed Jul. 26, 2021, 12 pages.
Baron et al., AWS certified Solutions Architect—Official Study Guide, Amazon Web Services, Wiley & Sons publication, dated 2017, 517 pages.
U.S. Appl. No. 16/411,039—Response to Final Office Action dated Oct. 21, 2021, filed Jan. 21, 2022, 18 pages.
PCT/US2017/021969—Article 34 Amendment, filed Jan. 11, 2018, 16 pages.
U.S. Appl. No. 16/411,039—Advisory Action dated Feb. 4, 2022, 4 pages.
U.S. Appl. No. 16/411,039—Response to Advisory Action dated Feb. 4, 2022, filed Feb. 22, 2022, 19 pages.
U.S. Appl. No. 16/411,039—Notice of Allowance dated Mar. 24, 2022, 18 pages.

\* cited by examiner

DE NOVO SENSITIVITY METADATA GENERATION FOR CLOUD SECURITY

PRIORITY DATA

This application is a continuation of U.S. patent application Ser. No. 16/408,215, filed Sep. 5, 2019, entitled "Small-Footprint Endpoint Data Loss Prevention (DLP)", which claims the benefit of U.S. Provisional Patent Application No. 62/675,692, titled "Small-Footprint Endpoint Data Loss Prevention (DLP)," filed on May 23, 2018. The provisional application is incorporated by reference as if fully set forth herein.

This application is a continuation of U.S. patent application Ser. No. 16/408,215, filed Sep. 5, 2019, entitled "Small-Footprint Endpoint Data Loss Prevention (DLP)", which is a continuation-in-part of U.S. Nonprovisional patent application Ser. No. 16/000,132, titled "Metadata-Based Data Loss Prevention (DLP) For Cloud Storage," filed on Jun. 5, 2018 (now U.S. Pat. No. 10,291,657 issued on May 14, 2019), which is a continuation of U.S. patent application Ser. No. 15/368,240, titled "Systems And Methods Of Enforcing Multi-Part Policies On Data-Deficient Transactions Of Cloud Computing Services," filed on Dec. 2, 2016, which claims the benefit of U.S. Provisional Patent Application No. 62/307,305, titled "Systems And Methods Of Enforcing Multi-Part Policies On Data-Deficient Transactions Of Cloud Computing Services," filed on Mar. 11, 2016; and This application is a continuation of U.S. patent application Ser. No. 16/408,215, filed Sep. 5, 2019, entitled "Small-Footprint Endpoint Data Loss Prevention (DLP)", which is a continuation-in-part of U.S. Nonprovisional patent application Ser. No. 16/000,132, titled "Metadata-Based Data Loss Prevention (DLP) For Cloud Storage," filed on Jun. 5, 2018 (now U.S. Pat. No. 10,291,657 issued on May 14, 2019), which is a continuation of U.S. patent application Ser. No. 15/368,246, titled "Middle Ware Security Layer For Cloud Computing Services," filed on Dec. 2, 2016, which claims the benefit of U.S. Provisional Patent Application No. 62/307,305, titled "Systems And Methods Of Enforcing Multi-Part Policies On Data-Deficient Transactions Of Cloud Computing Services," filed on Mar. 11, 2016. All applications listed are incorporated by reference as if fully set forth herein.

INCORPORATIONS

The following materials are incorporated by reference as if fully set forth herein:

U.S. Nonprovisional patent application Ser. No. 14/198,499, titled "Security For Network Delivered Services," filed on Mar. 5, 2014 (now U.S. Pat. No. 9,398,102 issued on Jul. 19, 2016);

U.S. Nonprovisional patent application Ser. No. 14/835,640, titled "Systems And Methods Of Monitoring And Controlling Enterprise Information Stored On A Cloud Computing Service (CCS)," filed on Aug. 25, 2015 (now U.S. Pat. No. 9,928,377 issued on Mar. 27, 2018);

U.S. Nonprovisional patent application Ser. No. 15/911,034, titled "Simulation And Visualization Of Malware Spread In A Cloud-Based Collaboration Environment," filed on Mar. 2, 2018;

U.S. Nonprovisional patent application Ser. No. 15/986,732, titled "Data Loss Prevention Using Category-Directed Parsers," filed on May 22, 2018;

U.S. Provisional Patent Application No. 62/488,703, titled "Reducing Latency And Error In Security Enforcement By A Network Security System (NSS)," filed on Apr. 21, 2017;

"Data Loss Prevention and Monitoring in the Cloud" by netSkope, Inc.;

"The 5 Steps to Cloud Confidence" by netSkope, Inc.;

"Netskope Active Cloud DLP" by netSkope, Inc.;

"Repave the Cloud-Data Breach Collision Course" by netSkope, Inc.; and

"NETSKOPE CLOUD CONFIDENCE INDEX™" by netSkope, Inc.

FIELD OF THE TECHNOLOGY DISCLOSED

The technology disclosed presents an improved endpoint data loss prevention (DLP) solution, referred to herein as "small-footprint endpoint DLP (sf-EDLP)," which enforces security policies at endpoints by relying on previously generated sensitivity metadata, rather than by performing content sensitivity scans at the endpoints. Since content sensitivity scans are computationally intensive and time consuming, sf-EDLP leads to a significantly simpler implementation, reduced runtime computation, and a smaller memory footprint; making it suitable for computationally constrained environments such as modern mobile devices.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Enterprise organizations have a business need to store sensitive data, such as financial or patient information, intellectual property (IP) and other information, depending on the business and industry. For example, personally identifiable information (PII) refers to information which can be used to distinguish or trace an individual's identity, such as their name, Social Security number, and biometric records, alone, or when combined with other personal or identifying information which is linked or linkable to a specific individual, such as date and place of birth and mother's maiden name. Protected health information (PHI) refers to individually identifiable health information, including demographic data, that relates to the individual's past, present or future physical or mental health or condition, the provision of health care to the individual, or the past, present, or future payment for the provision of health care to the individual, the individual's identity or for which there is a reasonable basis to believe it can be used to identify the individual. Individually identifiable health information includes many common identifiers such as name, address, birth date and Social Security number. Financial information includes credit card data and business accounting records.

Common channels for loss of sensitive data in an enterprise are the endpoints. Users may attempt to copy sensitive data to an unauthorized location, such as removable media. In one example, a user may try to copy a file containing confidential employee information from a system at work to a removable peripheral component interconnect (PCI) device such as a universal serial bus (USB) storage device, also referred to as a flash drive. Protection from copying sensitive data to unauthorized media is extremely important, as the copies or derived sensitive data from the files could later be distributed. In another case, users may attempt to print sensitive data to an unauthorized location.

The proliferation of channels gives rise to new data loss prevention (DLP) problems. False alerts to potential sensitivity, false positives, are among these problems. Multiple control interfaces and complex GUIs for setting up policies are also problems.

Given the success of DLP service for protecting sensitive data in cloud apps, enterprise data security admins are requesting the same service to cover DLP service to the endpoint.

An opportunity arises for the development of an improved endpoint DLP solution that obviates the need to perform computationally intensive content sensitivity scans at the endpoints. Improved user experience and reduced runtime computation and memory consumption at the endpoints, with improved DLP may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
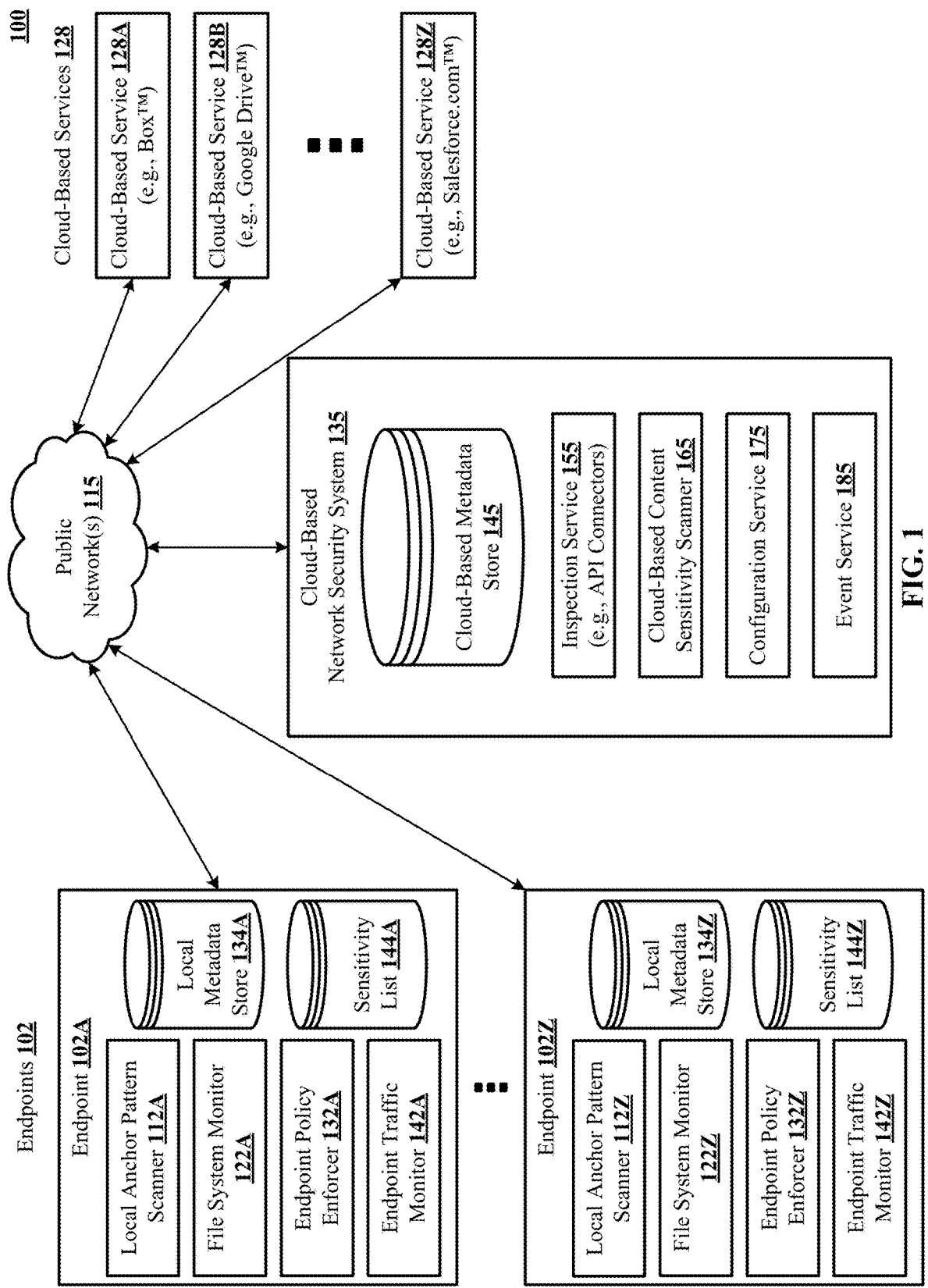
FIG. 1 illustrates one implementation of the technology disclosed operating in a cloud-based environment.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The discussion is organized as follows. First, an introduction describing some of the technical limitations of endpoint data loss prevention (DLP) is presented, followed by an overview of the technical improvements offered by various implementations. Then, a high-level description of cloud-based implementation is discussed at an architectural level, complemented by an on-premise implementation later. Next, the algorithms used by some implementations to provide the improved endpoint DLP are discussed using message flow charts. Lastly, more detailed architectures for implementing the system, together with network traffic monitoring in conjunction with file system monitoring are discussed.

INTRODUCTION

In many enterprises, the documents that are sensitive and vital to the business are stored in centralized locations so that they can be backed up and protected for data recovery and business continuity purposes. These centralized repositories are typically network mounted file servers. A migration of sensitive data from network mounted file servers to cloud storage services is occurring, with more and more sensitive data moving to the cloud with the rapid proliferation and adoption of cloud-based services like BOX™, GOOGLE DRIVE™, and SALESFORCE.COM™, which are affordable, easy-to-use and remotely-accessible via the endpoints.

Data loss prevention (DLP) solutions provide capabilities to classify sensitive data in cloud apps, generally detecting sensitive data in documents and preventing unauthorized access, saving or sharing of the sensitive data. A major shortcoming of existing DLP solutions is the volume generated of false positives that require incident-response analyst attention.

Enterprise security teams spend an enormous amount of time honing DLP for data protection and for reducing false positives. Because the cloud is not the only vector for data loss in an enterprise, data security admins would like to have a common policy across the various channels through which data can be compromised. An important goal for managing data security is utilization of common DLP rules and profiles for both cloud and endpoint security for a variety of endpoints, including WINDOWS™, MAC OS™, and mobile devices utilizing IOS™ and ANDROID™.

DLP is a very resource intensive process; string evaluation is computationally expensive, taking up extensive memory and CPU resources. In one example, while a user is working, antivirus software often appears to start randomly and cause word processing, spreadsheet and graphics applications to slow down or crash due to competition for CPU resources. Existing solutions that address the device use case are resource intensive. Some users even turn off existing DLP packages, to save time while working.

Endpoint DLP has the potential to tackle newer security issues such as exfiltration of sensitive data that is stored on cloud-based services but "in-use" at the endpoints which provide access to the sensitive data.

Protecting in-use data is achieved through security capabilities that are implemented as extensions to the operating system (OS) that powers the endpoints. In-use data protection requires constant monitoring of data movement within the OS, between the OS and the applications, and among the applications. For example, sensitive data may be prohibited from being shared between applications, and in this case, the copy-and-paste feature may be disabled for such data.

Much of the collaboration among workers has moved to the cloud, and a vast majority of documents are stored there. DLP can utilize the extensive CPU and memory resources of the cloud to complete the heavy lifting of classifying files. In both the use of network mounted file servers and cloud storage services, users either mount the network file servers on the endpoint or use a sync application to access the cloud-stored documents. In both these cases, it makes sense to scan and utilize centralized classification for stored files and to maintain an associated metadata store.

Data egress refers to data leaving an organization's network from an endpoint to uncontrolled locations—locations that are not under the purview of the organization's security apparatus. Examples of data egress to uncontrolled locations include copying files to removable media such as USB, CD/DVD, and external hard drives, printing files to a local printer, taking screen captures and pasting on a clipboard, and uploading files to an unsanctioned cloud-based service. Data egress is a regular part of network activity, but becomes a threat when sensitive data is exfiltrated.

Endpoint data loss prevention (DLP) addresses the risks associated with data egress through endpoints like workstations, laptops, phones, and tablets. The main objective of endpoint DLP is to protect exfiltration of sensitive data from the endpoints. An endpoint DLP solution is installed on the endpoints as an active agent that performs constant validation as data is accessed by applications. In addition, an endpoint DLP solution acts as a policy enforcer and prevents sensitive data from leaving the system, for example, by preventing protected data from being copied onto a USB drive.

To this end, the first action taken by an endpoint DLP solution is to identify sensitive data that is mandated by central policies for protection, i.e., sensitivity classification. Identifying sensitive data entails scanning the hard drives on the endpoints to detect protected content, a process commonly referred to as the "content sensitivity scan." Identifying in-use data means scanning the endpoint system memory for sensitive material. Regardless of the location where the data may be present, content sensitivity scan demands content analysis techniques that effectively identify protected material. Examples of content analysis techniques include pattern-based matching algorithms (for example, for identifying Social Security numbers or credit card numbers), generating a fingerprint for an entire file for exact matching, or creating hashes for specific parts of a file for partial matching.

Content-based analysis is computationally intensive and time consuming. Not all endpoints have the computing power or resources to perform content analysis, which also impacts the user experience. A good example is that although the endpoint antivirus software is always active, it does not perform virus scanning constantly because its scanning activities impact system performance significantly.

The technology disclosed presents an improved endpoint data loss prevention (DLP) solution, referred to herein as "small-footprint endpoint DLP (sf-EDLP)," which enforces security policies at the endpoints by relying on previously generated sensitivity metadata, rather than by performing the computationally intensive and time consuming content sensitivity scan at the endpoints. Portions of this Application refer to sf-EDLP as "endpoint policy enforcer."

Upon receiving a data egress request for a document, the sf-EDLP determines whether the document contains sensitive data by analyzing sensitivity metadata that classifies the document as sensitive or non-sensitive. Sensitivity metadata was previously generated as a result of deep inspection of the document, which occurred in advance of the data egress request and was performed by a server-side content sensitivity scanner. Deep inspection produces a sensitivity classification by subjecting the document to content analysis techniques like language-aware data identifier inspection, document fingerprinting, file type detection, keyword search, pattern matching, proximity search, regular expression lookup, exact data matching, metadata extraction, and language-agnostic double-byte character inspection. The sensitivity classification is stored as and identified by the sensitivity metadata.

As used herein, phrases such "previously generated," "proactively generated," "generated in advance of," and "generated prior to" refer to the sensitivity metadata being generated ahead of time in anticipation of its use in responding to the data egress request. For example, sensitivity metadata can be generated when the document is: (i) first stored on mass storage media (known as data at rest), (ii) first transmitted over the network (known as data in motion), or (iii) first created by a user on the endpoint (known as data in use).

Sensitivity metadata can be retrieved from a cloud-based metadata store populated by the inspection service, or from a local metadata store at the endpoint that is periodically synchronized with the cloud-based metadata store, or from an on-premise metadata store. The cloud-based metadata store can be a distributed in-memory cache such as AMAZON ELASTICACHE™, which provides low-latency access by caching the results of I/O-intensive database queries or the results of computationally intensive calculations.

Upon determining that the document is sensitive, the sf-EDLP enforces one or more security polices (or DLP policies) at the endpoint to prevent exfiltration of the document. This can include executing security actions like blocking the data egress request, seeking user justification, encrypting the document, quarantining the document, or coaching the user on the security policies. Additional details about the security policies that the sf-EDLP can enforce and the security actions it can execute can be found in the incorporated materials.

In the event when no sensitivity metadata is available for the document either in the local metadata store or in the cloud-based metadata store, the sf-EDLP invokes a local anchor pattern scanner configured at the endpoint. Instead of deep inspection, which is both analytically and computationally intensive, the local anchor pattern scanner performs minimalist content inspection of the document, which includes an anchor pattern check for common sensitivity identifiers like Social Security numbers, credit card numbers, bank account numbers, date of births, passwords, source code, and intellectual property elements. If the document scores positive on the anchor pattern check, it is sent to the content sensitivity scanner for deep inspection. The local metadata store and the cloud-based metadata store are updated with the results of the deep inspection.

A de novo way that the technology disclosed generates sensitivity metadata without needing to perform the content sensitivity scan at the endpoint or on the server-side is by tracking documents that are downloaded to the endpoint from sensitive cloud-based services and labelling such documents as sensitive for DLP policy enforcement in the future. The labels for the documents are stored as sensitivity metadata and used for responding to data egress requests, as discussed above. The labels are propagated to revised or copied versions of the documents. The labels can also be embedded in the documents.

Tracking is accomplished by combining: (i) network traffic monitoring of user interaction with a sensitive cloud-based service that led to the document download with (ii) file system monitoring of the document download to the endpoint. The technology disclosed detects a user's visit to the sensitive cloud-based service by analyzing the application layer traffic using deep application programming interface inspection (DAPII), and further detects that the document was saved to the endpoint as result of the visit by monitoring the endpoint's file system.

The technology disclosed offers an improved endpoint DLP solution that obviates the need to perform computationally intensive content sensitivity scans at the endpoints, with minimal CPU and memory consumption of local resources on the endpoints, to avoid impacting a user performing work on the device. Detailed implementations follow.

Cloud-Based Environment

We describe a system and various implementations for providing endpoint security using a so-called small-footprint endpoint DLP (sf-EDLP) solution. The system and processes are described with reference to FIG. 1. Because FIG. 1 is an architectural diagram, certain details are intentionally omitted to improve the clarity of the description. The discussion of FIG. 1 is organized as follows. First, the elements of the figure are described, followed by their interconnections. Then, the use of the elements is described in greater detail.

FIG. 1 illustrates one implementation of the technology disclosed operating in a cloud-based environment 100. The environment 100 includes endpoints 102A-Z, a cloud-based network security system (NSS), and cloud-based services 128A-Z.

Endpoints 102A-Z access documents stored in the cloud-based services 128A-Z via the cloud-based NSS 135. Endpoints 102A-Z respectively include local anchor pattern scanners 112A-Z, file system monitors 122A-Z, endpoint policy enforcers 132A-Z, endpoint traffic monitors 142A-Z, local metadata stores 134A-Z, and sensitivity lists 144A-Z.

Cloud-based NSS 135 includes a cloud-based metadata store 145, an inspection service 145, a cloud-based content sensitivity scanner 165, a configuration service 175, and an event service 145.

The modules of the endpoints 102A-Z and the cloud-based NSS 135 can be implemented in hardware or software, and need not be divided up in precisely the same blocks as shown in FIG. 1. Some of the modules can also be implemented on different processors or computers, or spread among a number of different processors or computers. In addition, it will be appreciated that some of the modules can be combined, operated in parallel or in a different sequence than that shown in FIG. 1 without affecting the functions achieved. Also as used herein, the term "module" can include "sub-modules," which themselves can be considered to constitute modules. For example, the local anchor pattern scanner 112A, the file system monitor 122A, the endpoint policy enforcer 132A, the endpoint traffic monitor 142A, the local metadata store 134A, and/or the sensitivity list 144A can be considered to be sub-modules of an endpoint security module (not shown). The blocks in the endpoints 102A-Z and the cloud-based NSS 135, designated as modules, can also be thought of as flowchart steps in a method. A module also need not necessarily have all its code disposed contiguously in memory; some parts of the code can be separated from other parts of the code with code from other modules or other functions disposed in between.

The interconnections of the elements of environment 100 are now described. The public network(s) 115 couples the endpoints 102A-Z, the cloud-based NSS 135, and the cloud-based services 128A-Z, all in communication with each other (indicated by solid double-arrowed lines). The actual communication path can be point-to-point over public and/or private networks. Some items, such as the endpoint policy enforcers 132A-Z, might be delivered indirectly, e.g., via an application store (not shown). The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

Endpoints 102A-Z can be desktop computers, laptops, tablet computers, mobile phones, or any other type of computing devices. The engines or system components of environments 100 such as the cloud-based NSS 135 are implemented by software running on varying types of computing devices. Example devices are a workstation, a server, a computing cluster, a blade server, and a server farm.

Having introduced the elements of FIG. 1 and their interconnections, elements of the figure are now described in greater detail.

In FIG. 1, three cloud-based services are shown, however, it is understood that environment 100 can include any number of cloud-based services. Cloud-based services 128A-Z store data such as documents and thus can also be referred to as cloud-based data stores or cloud-based document stores Cloud-based services 128A-Z provide functionality to users that is implemented in the cloud and that is the target of DLP policies, e.g., logging in, editing documents, downloading bulk data, reading customer contact information, entering payables, and deleting documents. They can be a network service or application, or can be web-based (e.g., accessed via a URL) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include BOX™, GOOGLE DRIVE™ SALESFORCE.COM™, DROPBOX™, AMAZON AWS™, MICROSOFT ONEDRIVE 365™, APPLE ICLOUD DRIVE™, ORACLE ON DEMAND™, SUGARSYNC™, IDRIVE™, and SPIDEROAK ONE™.

Cloud-based services 128A-Z publish their application programming interfaces (APIs) to allow a third party to communicate with them and utilize their underlying data. An API refers to a packaged collection of code libraries, routines, protocols methods, and fields that belong to a set of classes, including its interface types. The API defines the way that developers and programmers can use the classes for their own software development, just by importing the relevant classes and writing statements that instantiate the classes and call their methods and fields. An API is a source code-based application intended to be used as an interface by software components to communicate with each other. An API can include applications for routines, data structures, object classes, and variables. Basically, an API provides an interface for developers and programmers to access the underlying data, platform capabilities, and features of cloud-based services. Implementations of the technology disclosed use different types of APIs, including web service APIs such as HTTP or HTTPs based APIs like SOAP, WSDL, Bulk, XML-RPC and JSON-RPC and REST APIs (e.g., FLICKR™, GOOGLE STATIC MAPS™ GOOGLE GEO-LOCATION™), web socket APIs, library-based APIs like JavaScript and TWAIN (e.g., GOOGLE MAPS™ Javascript API, DROPBOX™ JavaScript Data store API, TWILIO™ APIs, Oracle Call Interface (OCI)), class-based APIs like Java API and Android API (e.g., GOOGLE MAPS™ Android API, MSDN Class Library for .NET Framework, TWILIO™ APIs for Java and C#), OS functions and routines like access to file system and access to user interface, object remoting APIs like CORBA and .NET Remoting, and hardware APIs like video acceleration, hard disk drives, and PCI buses. Other examples of APIs used by the technology disclosed include AMAZON EC2 API™, BOX CONTENT API™, BOX EVENTS API™, MICROSOFT GRAPH™, DROPBOX API™, DROPBOX API v2™, DROPBOX CORE API™, DROPBOX CORE API v2™, FACEBOOK GRAPH API™, FOURSQUARE API™, GEONAMES API™, FORCE.COM API™, FORCE.COM METADATA API™, APEX API™, VISUALFORCE API™, FORCE.COM ENTERPRISE WSDL™, SALESFORCE.COM STREAMING API™, SALESFORCE.COM TOOLING API™, GOOGLE DRIVE API™, DRIVE REST API™, ACCUWEATHER API™, and aggregated-single API like CLOUDRAIL™ API.

Having described the cloud-based services 128A-Z and their APIs, the discussion now turns to the cloud-based network security system (NSS) 135.

Proactive Sensitivity Metadata Generation

Cloud-based NSS 135 is interposed between the endpoints 102A-Z and the cloud-based services 128A-Z to provide several security-related functionalities; key among them being proactively generating sensitivity metadata and storing it in the cloud-based metadata store 145. Additional details about the cloud-based NSS 135 can be found in the incorporated materials.

Cloud-based NSS 135 uses a combination of the inspection service 155 and the cloud-based content sensitivity scanner 165 to proactively generate the sensitivity metadata. The inspection service 155 generates those parts (or fields) of the sensitivity metadata that describe a document and its audit trail, i.e., the path followed by the document across its lifecycle. Inspection service 155 accomplishes this by acting as an inline proxy that actively analyzes documents en route to or from the cloud-based services 128A-Z and also by acting as an introspector that retroactively analyzes documents already deposited into the cloud-based services 128A-Z. In both modes, the inspection service 155 uses API connectors and deep API inspection (DAPII) for metadata generation. Additional details about the inspection service 155 can be found in the incorporated materials.

Cloud-based content sensitivity scanner 165 serves as the ultimate authority for classifying documents as sensitive or not sensitive, supporting deep inspection techniques that are computationally infeasible at the endpoints due to the scale of resources needed. Some examples of deep inspection techniques used by the scanner 165 for sensitivity classification are language-aware data identifier inspection, document fingerprinting, file type detection, keyword search, pattern matching, proximity search, regular expression lookup, exact data matching, metadata extraction, and language-agnostic double-byte character inspection. Sensitivity is defined by one or more security policies (or DLP policies). In other words, the scanner 165 evaluates documents for data deemed sensitivity by the DLP policies, which can include payment Card information (PCI), personally-identifiable information (PII), and electronic personal health information (ePHI). Additional details about different DLP policies and the sensitive data they protect can be found in the incorporated materials.

Cloud-based content sensitivity scanner 165 can perform the sensitivity classification in real-time when the documents are intercepted by the inspection service 155, while in transit to or from the cloud-based services 128A-Z. It can also perform the sensitivity classification when the documents are crawled or registered by the inspection service 155, while at rest in the cloud-based services 128A-Z. It encodes the results of the sensitivity classification in the sensitivity metadata, e.g., by assigning a "sensitive" or "non-sensitive" flag (or label) to a classification field of the sensitivity metadata. Results of sensitivity scanning can be stored 578 in a cloud-based metadata store 145. Additional details about the scanner 165 can be found in the incorporated materials.

Some examples of the sensitivity metadata generated by the inspection service 155 and the cloud-based content sensitivity scanner 165 are unique document identifier, document integrity checksum such as MD5, document fingerprint such as Rabin fingerprint, document true file type such as portable document format (PDF), name of the cloud-based service on which a document is stored, sensitivity (or non-sensitivity) of the document, type of sensitivity such as PCI, PII, and ePHI, name and sensitivity (or non-sensitivity) of the source from which the document originated (e.g., a source cloud-based service, a source website, a source server, a source database, a source partition, a source user, a source user group, a source folder, a source device), inheritance information such as a PDF file created from an original word processing application, and log of activities performed on the document such as creation, revision, versioning, cloning, deletion, sharing, and transmission to or from the cloud-based service. Additional examples of the sensitivity metadata can be found in the incorporated materials.

Once generated, the sensitivity metadata is stored in the cloud-based metadata store 145, which can be an in-memory cache like AMAZON ELASTICACHE™, a SQL database like MICROSOFT AZURE™, or a NoSQL database like APACHE CASSANDRA™. Cloud-based metadata store 145 is thus the centralized source of truth for sensitivity classification of cloud documents accessed by an organization's users through their endpoints.

Having described the proactive generation of sensitivity metadata by the cloud-based NSS 135, the discussion now turns to how the sensitivity metadata is used to provide small-footprint endpoint data loss prevention (sf-EDLP).

Small-Footprint Endpoint Data Loss Prevention (Sf-EDLP)

Endpoints 102A-Z are configured with an endpoint security module (not shown), which can further comprise the local anchor pattern scanners 112A-Z, the file system monitors 122A-Z, the endpoint policy enforcers 132A-Z, the endpoint traffic monitors 142A-Z, the local metadata stores 134A-Z, and/or the sensitivity lists 144A-Z. Configuration service 175 can deploy the endpoint security module as an agent, downloadable via e-mail or silently installed using mass deployment tools like CONFIGMGR™, ALTRIS™, and JAMF™. It also includes a management plane for defining DLP policies that are to be enforced at the endpoints 102A-Z by the endpoint policy enforcers 132A-Z. Event service 185 receives and records any security events generated by the endpoint policy enforcers 132A-Z, for logging and machine learning-type analysis. Examples of security events include notifications and audit trails of security actions taken as part of DLP policy enforcement at the endpoints 102A-Z.

Data Egress Request Detection

Security enforcement at an endpoint 102A begins with a file system monitor 122A detecting data egress requests. Endpoint 102A has a memory module (not shown) that stores the documents in-use at the endpoint 102A. The memory module in turn has a file system that controls how the documents are stored and retrieved to fulfill the data egress requests. Further, as part of its operating system (OS), endpoint 102A has a file system driver that interprets a structure of the file system and presents a logical hierarchical view to applications that make the data egress requests. The data egress requests are formulated as file system calls that are exchanged between the applications and the file system via the file system driver. For example, an application can send a file write system call to the file system driver to copy the document from the endpoint 102A to a USB drive, and the file system driver can communicate with the file system to copy the document to the USB drive. Other examples of file system calls pertaining to data egress requests involve downloading the document from a web browser, opening, closing, saving, editing, revising, versioning, copying, or deleting the document, read and write operations, print operations, screen capture operations, and copy, cut, paste operations.

The file system monitor 122A detects the data egress requests by intercepting the file system calls made to the file system driver. It then notifies an endpoint policy enforcer 132A of the data egress requests, which in turn subjects them to policy enforcement. The endpoint policy enforcer 132A includes one or more security policies (or DLP policies) that specify what security actions to take when a data egress request involves exfiltration of sensitive data. Some examples of security actions are blocking the data egress request, seeking user justification, document encryption, document quarantine, and coaching. For example, there may be a DLP policy prohibiting the copying of sensitivity data to removable media such as a USB drive. In such a case, the file system monitor 122A can intercept a file write system call being sent from an application to the file system driver, and the endpoint policy enforcer 132A can prevent the file system driver from communicating with the file system, thereby not allowing a sensitive document from being copied to the USB drive.

Having described how the data egress requests are intercepted and made available to the endpoint policy enforcers 132A-Z for policy enforcement, the discussion now turns to how the endpoint policy enforcers 132A-Z enforce DLP policies at the endpoints 102A-Z without needing to perform the computationally intensive and time consuming content sensitivity scan at the endpoints 102A-Z.

Sensitivity Metadata-Based Endpoint Policy Enforcement

In response to receiving data egress requests, the endpoint policy enforcer 132A retrieves the sensitivity metadata and enforces a data loss prevention policy at the endpoint, based on the retrieved sensitivity metadata and without performing content sensitivity scan of the document at the endpoint. Common rules enforced by endpoint policy enforcer 132A include a rule that once a file has been deemed sensitive, it will remain sensitive for the life of the document. During collaboration, with the use of common documents among teams, every file may not be classified each time. The first time the document is classified as sensitive, the document ID and checksum are maintained for the editors of the document.

Continuing the description of FIG. 1, the local metadata store 134A includes a list of local files and their associated metadata, in multiple categories. One category includes excluded files such as system files and file types such as audio and video which are not relevant for DLP. In some implementations, files downloaded from the Internet can be excluded as well. A second category includes known files for which the cloud metadata data store has sensitive metadata. A third category includes unknown files for which metadata needs to be updated in local metadata store 134A.

Figure 2:
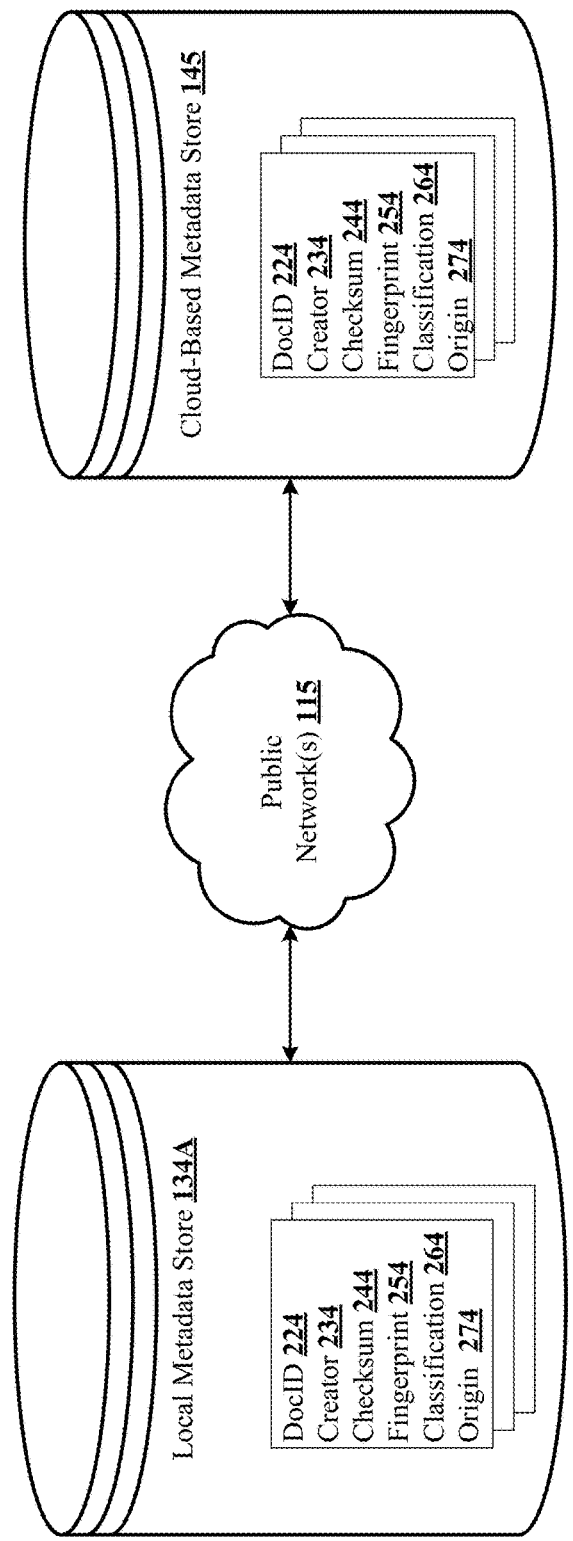
FIG. 2 shows one example of sensitivity metadata and its synchronization between a local metadata store and a cloud-based metadata store.

FIG. 2 shows a block diagram 200 in which sensitivity metadata is periodically synchronized between the local metadata store 134A and the cloud-based metadata store 145 via the public network(s) 115. Sensitivity metadata for a file can include DocID 224, creator 234, checksum 244, fingerprint 254, classification 264, and origin 274.

The local anchor pattern scanner 112A is a minimalist DLP engine that acts a pre-filter for determining whether a document needs to be further inspected by the cloud-based content sensitivity scanner 165. Scanner 112A executes an anchor pattern check which looks for certain common sensitivity identifiers in the document. Examples of such identifiers or patterns are Social Security numbers, credit card numbers, bank account numbers, date of births, passwords, source code, and intellectual property elements. If the document scores positive on the anchor pattern check, it is sent to the cloud-based content sensitivity scanner 165 for deep inspection. The local metadata store 134A and the cloud-based metadata store 145 are updated with the results of the deep inspection.

Being a minimalist DLP engine, the local anchor pattern scanner 112A does not require significant computational resources and thus does not impact the endpoint performance. In implementations, it is selectively invoked only in scenarios when the sensitivity metadata is not available in the local metadata store 134A and/or the cloud-based metadata store 145.

Exfiltration is data theft, including the unauthorized release of data from within a computer system or network. The disclosed technology controls exfiltration of data in documents via endpoints, in response to detecting data egress events at the endpoints that would push the data in the documents from the endpoints to uncontrolled locations. In one case, exfiltration control includes accessing a cloud-based metadata store and retrieving sensitivity metadata previously generated in advance of the data egress events to classify the documents as sensitive or not sensitive based on deep inspection of the documents and enforcing data loss prevention policies at the endpoints based on the retrieved sensitivity metadata and without scanning the documents at the endpoint for sensitivity, as described next relative to FIG. 3. In a second case, exfiltration control includes accessing a local metadata store at the endpoint that is periodically synchronized with the cloud-based metadata store, as described infra relative to FIG. 4. In a third case, exfiltration control includes generating sensitivity data for files requested at the endpoint, for which no sensitivity data already exists, as described relative to FIG. 5.

Figure 3:
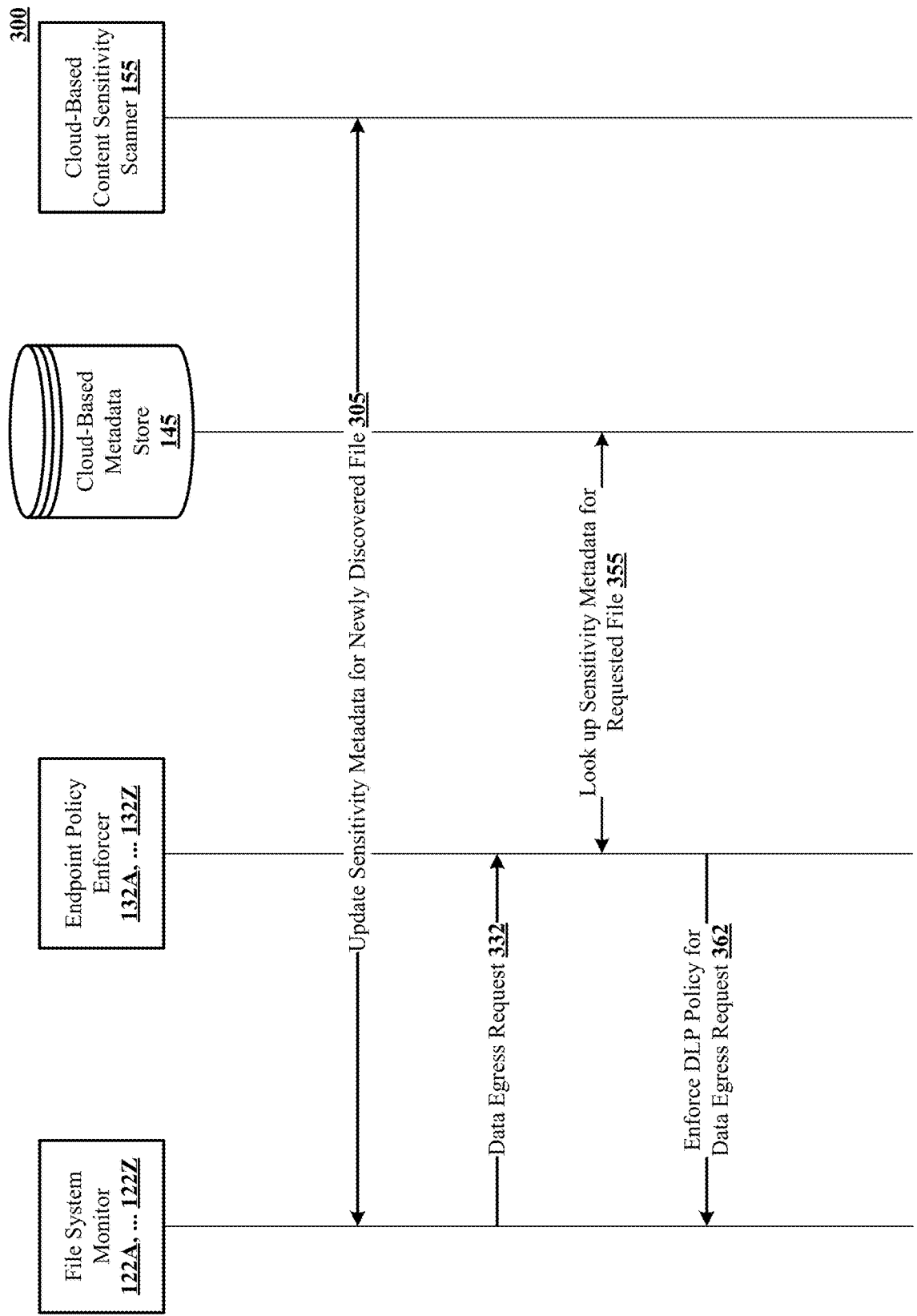
FIG. 3 shows a first example message flow for endpoints for enforcing data loss prevention (DLP) policies at an endpoint in the environment shown in FIG. 1, without needing to perform content sensitivity scan at the endpoint.

FIG. 3 shows a first example message flow 300 for endpoints for enforcing data loss prevention policies at an endpoint in environment 100. When a new file is being opened or modified, a process starts that confers with endpoint policy enforcer 132A, 132Z to determine whether a DLP policy is in place to block copying of the file. These requests include but are not limited to calls to read and write files, to copy files to USB drives, to print documents, and cut/paste operations of content within a document. The disclosed technology is utilized to determine when a document at the endpoint is sensitive without performing a content sensitivity scan and, if the document is determined to be sensitive, to disallow the request.

Cloud-based content sensitivity scanner 165 updates sensitivity metadata for a newly discovered file 305. Inspection service 155 sends documents in the cloud-based services 128A-Z to the scanner 165 for proactive classification (sensitive or non-sensitive) even before a user makes a data egress request.

When endpoint policy enforcer 132A, 132Z receives a data egress request 332 to push data in documents from the endpoint to uncontrolled locations, endpoint policy enforcer 132A, 132Z accesses the cloud-based metadata store 145 that includes sensitivity metadata previously generated in advance of the requests to classify the documents as sensitive or non-sensitive 355 based on deep inspection of the documents. Deep inspection produces a sensitivity classification by subjecting the document to content analysis techniques like language-aware data identifier inspection, document fingerprinting, file type detection, keyword search, pattern matching, proximity search, regular expression lookup, exact data matching, metadata extraction, and language-agnostic double-byte character inspection. In response to receiving the data egress request 332 for a document, endpoint policy enforcer 132A, 132Z determines sensitivity of the document by retrieving the sensitivity metadata for the document from the cloud-based metadata store 145, and endpoint policy enforcer 132A, 132Z enforces a data loss prevention policy at the endpoint based on the retrieved sensitivity metadata and without performing a sensitivity scan of the document at the endpoint. Endpoint policy enforcer 132A, 132Z enforces DLP policy for data egress requests 362. Some implementations include blocking a request if it is determined that the retrieved sensitivity metadata identifies the document as sensitive. Other implementations include additional response security actions including but not limited to quarantine, encryption, justification, and coaching. Endpoint policy enforcer 132A, 132Z allows fulfillment of the data egress request when it determines that the retrieved sensitivity metadata identifies the document as non-sensitive.

Figure 4:
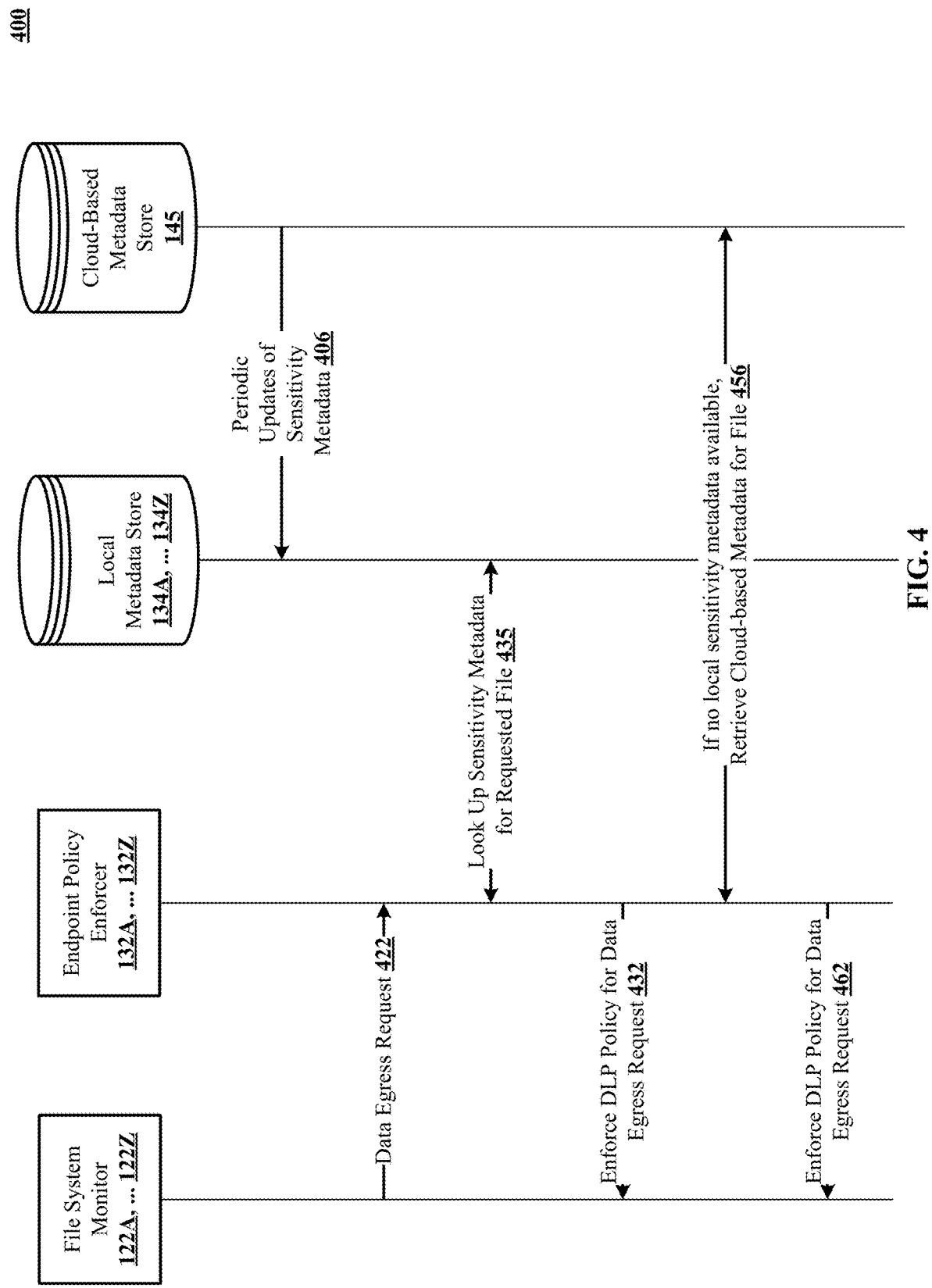
FIG. 4 shows a second exfiltration control example for enforcing DLP policies at an endpoint, when an endpoint policy enforcer has access to the local metadata store that is periodically synchronized with the cloud-based metadata store.

FIG. 4 shows a second exfiltration control example 400 for enforcing DLP policies at an endpoint, when the endpoint policy enforcer 132A, 132Z has access to the local metadata store 134A, 134Z that is periodically synchronized with (or periodically updated from) the cloud-based metadata store 145. Endpoint policy enforcer 132A, 132Z can access the local metadata store 134A, 134Z which includes, at the endpoint, the sensitivity metadata that is periodically synchronized with the cloud-based metadata store 145. Periodic updates of sensitivity metadata 406 from the cloud-based metadata data store 145 to the local metadata store 134A, 134Z ensure that the endpoint policy enforcer 132A, 132Z that needs sensitivity information on a document can look up the file in the local metadata store 134A, 134Z, based on the document checksum, and receive the associated metadata without redoing DLP sensitivity classification for the document. Endpoint policy enforcer 132A, 132Z first retrieves the sensitivity metadata for the requested file 435 from the local metadata store 134A, 134Z in response to data egress request 422. If local sensitivity metadata is available, the endpoint policy enforcer 132A, 132Z enforces the DLP policy for data egress requests 432. Some implementations include blocking a request if it is determined that the retrieved sensitivity metadata identifies the document as sensitive. Other implementations include additional response security actions including but not limited to quarantine, encryption, justification, and coaching. Endpoint policy enforcer 132A, 132Z allows fulfillment of the data egress request when it determines that the retrieved sensitivity metadata identifies the document as non-sensitive. If no sensitivity metadata is available for the document in from local metadata store 134A, 134Z, the endpoint policy enforcer 132A, 132Z then retrieves the sensitivity metadata 456 from the cloud-based metadata data store 145. If cloud-based sensitivity metadata is available, the endpoint policy enforcer 132A, 132Z enforces the DLP policy for data egress requests 462.

Figure 5:
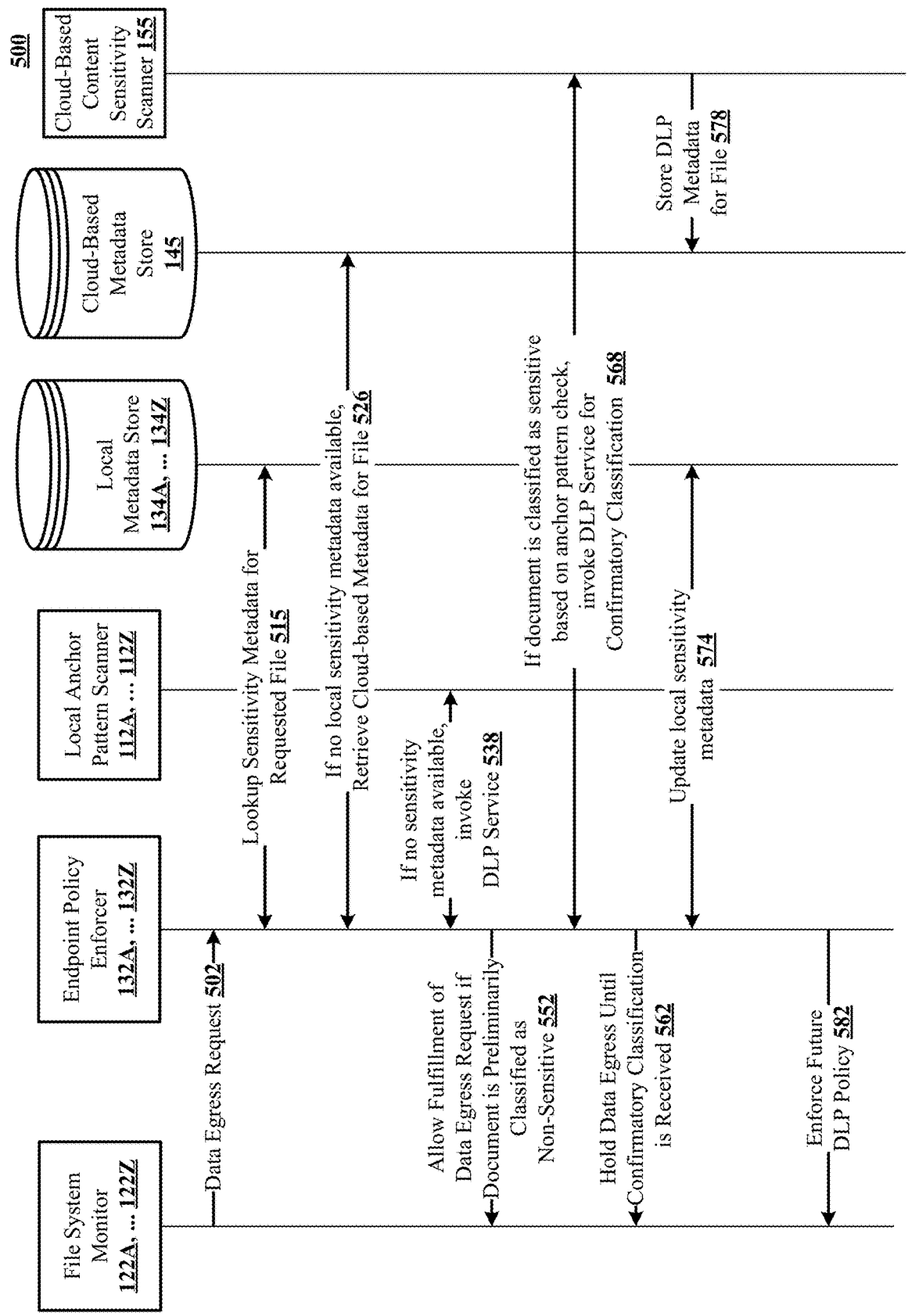
FIG. 5 shows a third exfiltration control example for enforcing DLP policies at an endpoint for a scenario in which a user makes a data egress request at the endpoint and no sensitivity metadata is available for the document.

FIG. 5 shows a third exfiltration control example 500 for enforcing data loss prevention policies at an endpoint in the environment 100—for a scenario in which a user makes a data regress request 502 at the endpoint and no sensitivity metadata is available for the document locally 515 or in the cloud 526. In this case, the endpoint policy enforcer 132A, 132Z invokes the local anchor pattern scanner 112A, 112Z for sensitivity classification of uninspected documents added to the endpoint and updates the local metadata store to identify the sensitivity classification of the uninspected documents for further data loss prevention policy enforcement at the endpoint. In one example, the data egress request occurs when a worker tries to copy a file to their USB drive. If the document is determined to be potentially sensitive, the local anchor pattern scanner 112A, 112Z sends the file in question to the cloud-based content sensitivity scanner 165 for classification. The copy action will be blocked until the sensitivity metadata is returned from the scanner 165 and the endpoint policy enforcer 132A, 132Z deems the copy action to be allowed for the file being scrutinized.

Continuing the description of the work flow shown in FIG. 5, the endpoint policy enforcer 132A, 132Z invokes the local anchor pattern scanner 112A, 112Z, which includes a sensitivity scanner and runs on the endpoint, and which preliminarily classifies the document as sensitive or non-sensitive based on anchor pattern check 538. In one example, the local anchor pattern scanner 112A, 112Z applies a pre-filter that searches for easily recognizable data, such as credit card data, which occurs as twelve or sixteen digit strings. If the local anchor pattern scanner 112A, 112Z preliminarily classifies the document as non-sensitive based on the anchor pattern check, the endpoint policy enforcer 132A, 132Z allows fulfillment of the data egress request 552.

Further continuing the description of FIG. 5, if a document is determined to be potentially sensitive based on the anchor pattern scan, the local anchor pattern scanner 112A, 112Z preliminarily classifies the document as sensitive, and the endpoint policy enforcer 132A, 132Z invokes the cloud-based content sensitivity scanner 165 for confirmatory classification 568 (sensitive or non-sensitive). Endpoint policy enforcer 132A, 132Z keeps the data egress request on hold 562 until the confirmatory sensitivity classification is received. Scanner 165 confirmatory classifies the document that scored positive on the anchor pattern check as sensitive or non-sensitive based on more accurate but computationally intensive deep inspection, and endpoint policy enforcer 132A, 132Z receives the resulting sensitivity metadata identifying the confirmatory sensitivity classification. Endpoint policy enforcer 132A, 132Z updates the local metadata store 134A, 134Z to include the sensitivity metadata 574 with the confirmatory sensitivity classification (sensitive or non-sensitive), enabling future data loss prevention policy enforcement for that file at the endpoint 582.

Having described the small-footprint endpoint data loss prevention (sf-EDLP) implementations, the discussion now turns to further optimizations of the sf-EDLP using de novo sensitivity metadata generation.

De Novo Sensitivity Metadata Generation

Figure 6:
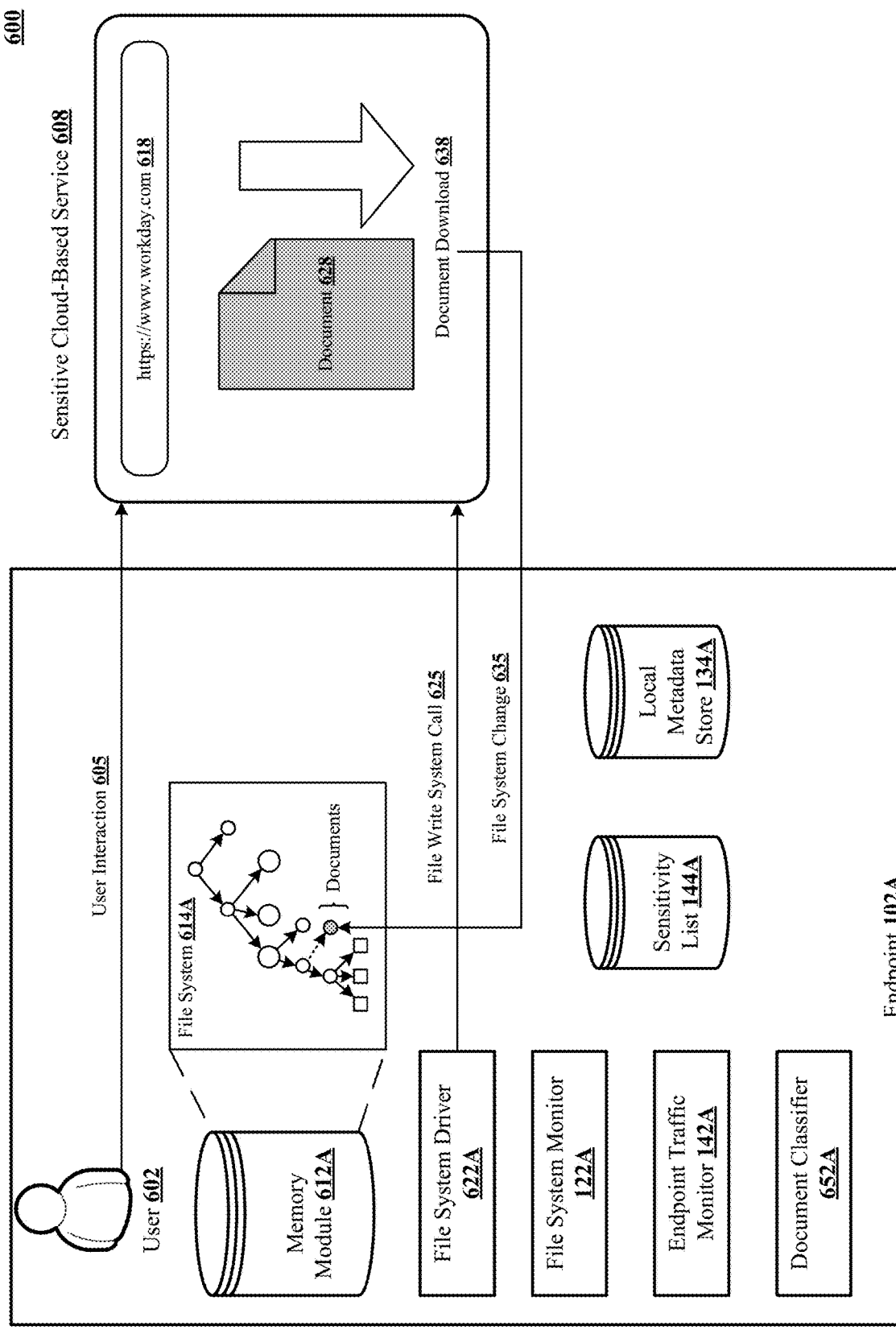
FIG. 6 illustrates one implementation of de novo sensitivity metadata generation using a combination of network traffic monitoring and file system monitoring, without needing to perform the content sensitivity scan at the endpoint or on the server-side.

FIG. 6 illustrates one implementation of de novo sensitivity metadata generation 600 using a combination of network traffic monitoring and file system monitoring, without needing to perform the content sensitivity scan at the endpoint or on the server-side.

The implementations discussed above focused on proactively generating the sensitivity metadata on the server-side cloud-based network security system 135 with computationally intensive techniques like deep inspection, and subsequently using it at the endpoint 102A for responding to data egress requests. The technology disclosed adds another level of computational efficiency to endpoint DLP by generating sensitivity metadata without the need to perform any content-based analysis either at the endpoint or on the server-side. More details follow.

A cloud-based service can be labelled or identified as a "sensitive cloud-based service" based on the functionality it provides and the sensitive nature of data it stores. For example, cloud-based services like SALESFORCE-.COM™, WORKDAY™, SERVICENOW™ and ORACLE ON DEMAND™ can be considered sensitive because they allow enterprise users with appropriate credentials to host and generate documents containing sensitive information such human resources (HR) data, customer relationship management (CRM) data, and financial data. Such sensitive cloud-based services are uniquely identified in the sensitivity lists 144A-Z based on their respective unified resource locators (URLs). Sensitivity lists 144A-Z are maintained at the endpoints 102A-Z and made available to the endpoint traffic monitor 142A-Z to monitor network traffic directed to and from these sensitive cloud-based services.

Enterprise users can also download documents from these sensitive cloud-based services onto their respective endpoints. To prevent exfiltration of the downloaded documents from the endpoints, a first approach could be to review contents of the documents and apply a DLP policy to determine if the documents contain sensitive information. However, this approach requires considerable amount of processing, causing latencies and degrading user experience. To avoid these issues, the technology disclosed uses an efficient approach for sensitivity classification of documents downloaded to endpoints from sensitive cloud-based services.

The technology disclosed combines network traffic monitoring of user interaction with cloud-based services identified as sensitive with file system monitoring of document download to an endpoint from the sensitive cloud-based services. The combination of the network traffic monitoring and the file system monitoring generates sensitivity metadata that labels documents downloaded to the endpoint from the sensitive cloud-based services as sensitive and persists the sensitivity metadata in a local metadata store at the endpoint.

Endpoint traffic monitor 142A performs the network traffic monitoring. Depending on the type of device, endpoint traffic monitor 142A can be a virtual private network (VPN) such as VPN-on-demand or per-app-VPN that uses certificate-based authentication. For example, for IOS™ devices, it can be a per-app-VPN or can be a set of domain-based VPN profiles. For ANDROID™ devices, it can be a cloud director mobile app. For WINDOWS™ devices, it can be a per-app-VPN or can be a set of domain-based VPN profiles.

Network traffic monitoring begins with a request (e.g., web browser HTTP GET request) by a user 602 for a URL 618 (e.g., https://www.workday.com) of a cloud-based service (e.g., WORKDAY™) being received. Endpoint traffic monitor 142A parses the URL 618 to determine whether it belongs to one of the cloud-based services identified as sensitive in the sensitivity list 144A. In a browser add-on context, the URL is directly received and subject to analysis. This may also allow for subtle differentiation, e.g., handling "subdomain.domain.tld" differently from "www.domain.tld." In contrast, in the case of a secure tunneling agent, network packets destined to IP addresses that match the DNS resolution of a URL in the sensitivity list 144A are identified. Thus, if "subdomain.domain.tld" and "www.domain.tld" share the same network address, both will be deemed sensitive even if the sensitivity list 144A identifies one and not the other.

In some implementations, the cloud-based network security system 135 performs application signature generation to assist enterprises in generating sensitivity lists that describe cloud-based services easily. Signature generation includes periodically crawling a predefined list of domains of cloud-based services. For each cloud-based service, the URLs referred to by the pages crawled that do not need an account or login are identified. This can be a "whitelist" of URLs associated with cloud-based services that are generally not considered sensitive. Similarly, a list of domains and associated URL formats that correspond to a given cloud-based service can be provided, this becomes a "blacklist" of URLs. In one implementation, the blacklist is manually maintained. Thus a decision about whether to monitor network traffic to and from a cloud-based service is based on its URLs and/or a signature being found in the sensitivity list 144A as follows.

First, extract the domain name and URL are extracted from the HTTP request. Second if the domain name or URL is on the sensitivity list 144A or contains a variation of the enterprise identifier (e.g., if company identifier is "netskope" or "exampleco" look for "hostedservice.com/netskope" or "exampleco.hostedservice.com") treat the request as a request for a sensitive cloud-based service. Note in some implementations, the administrator for an enterprise can identify the enterprise-specific identifier used for each cloud-based service via the management interface. Similarly, if the domain name or URL is present on the whitelist the request can be bypassed.

This approach can also be used on the server-side to limit the application of DLP policies to relevant URLs. Additionally, in some implementations the crawling process identifies a list of URLs corresponding to login events for various cloud-based services. This list can assist in identifying cloud login events. In other implementations, operators of cloud-based services may provide information to the operator of the network security system (NSS) 135 to assist in defining sensitivity list 144A and identifying whitelists/blacklists.

Consider that URL 618 was found in the sensitivity list 144A (e.g., based on string pattern matching), and thus inferred as belonging to the sensitive cloud-based service WORKDAY™ 608. Next, the URL 618 is selectively routed to the network security system 135. For URLs that are not found in the in the sensitivity list 144A, the normal host operating routing system is applied.

Once inserted between the endpoint 102A and the sensitive cloud-based service 608, the network security system 135 uses deep API inspection (DAPII) to track user interaction 605 with the sensitive cloud-based service 608. Examples of tracked user interactions are logging in, generating documents, editing documents, downloading documents, sharing documents, uploading documents, and logging out. In particular, a user interaction involving a document download is tracked by parsing application layer traffic that initiates the document download. In one implementation, the application layer traffic is encoded in transaction data that includes application programming interface (API) parameter strings and data interchange formats such as JavaScript Object Notation (JSON), Extensible Markup Language (XML), Simple Object Access Protocol (SOAP), and Representational State Transfer (REST). Transaction data allows the network security system 135 to interpret what actions a user is performing in the sensitive cloud-based service 608 as it is happening. So, for example, the network security system 135 can detect for an organization that a user A in sales department requested to download a "quarterly sales targets for all sales persons" report at 10 AM in San Francisco, Calif. In some implementations, the DAPII part of the network traffic monitoring is performed client-side at the endpoint 102A.

Network traffic monitoring is complemented by file system monitoring, which is performed by the file system monitor 122A. When a document 628 is downloaded to the endpoint 102A from the sensitive cloud-based service 608, a file system driver 622A issues a file write system call 625 that writes the downloaded document 638 to a memory module 612A of the endpoint 102A, and updates the file system 614A to reflect the newly added document (indicated in FIG. 6 by a grey node). Examples of the file system 614A are Portable Operating System Interface (POSIX), File Allocation Table (FAT) systems, New Technology File System (NTFS), ext2, ext3, ext4, Network File System (NFS), Server Message Block (SMB), and ISO 9660. File system monitor 122A intercepts the file write system call 625, detects the file system change 635 to the file system 614A, and infers that a document has been downloaded to the endpoint 102A.

Next, a document classifier 652A labels the document 628 as "sensitive" based on a combination of (i) the inference from the network traffic monitoring that document 628 originated from the sensitive cloud-based service 608 (and hence likely contains sensitive data) and (ii) the inference from the file system monitoring that the document 628 was downloaded to the endpoint 102A. The local metadata store 134A is updated to indicate the sensitive nature of the document 628 by associating a unique checksum, fingerprint and/or ID of the document 628 with a sensitivity metadata label (e.g., origin 274: "sensitive"). This is referred to as de novo sensitivity metadata generation because the document 628 is classified as sensitive without any content-based analysis, either at the endpoint 102A or at the network security system 135.

The labels for the documents are stored as sensitivity metadata and used for responding to data egress requests and endpoint DLP policy enforcement in the future without scanning the document 628 at the endpoint 102A for sensitivity, as discussed above.

Document classifier 652A can also embed the sensitivity metadata label assigned to the document 628 as a marker to the document 628. This enables downstream processes to simply identify sensitivity classification of the document 628 by viewing the embedded sensitivity metadata label. The labels are propagated to revised or copied versions of the documents.

Figure 7:
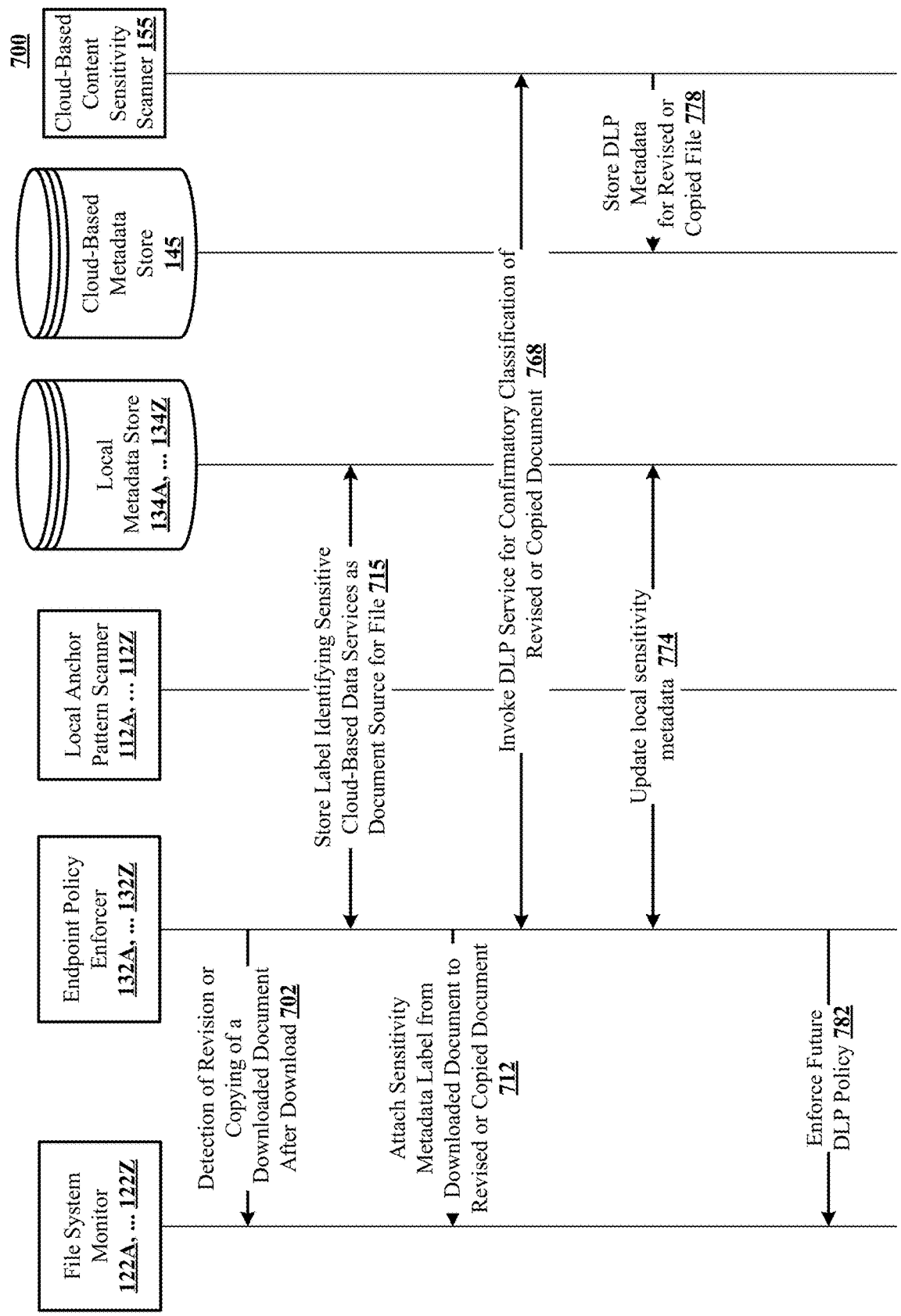
FIG. 7 exemplifies the DLP policy enforcement for the case in which sensitivity data gets updated in response to detecting a revision or copying of a downloaded document at the endpoint, after the download.

FIG. 7 exemplifies the DLP policy enforcement for the case 700 in which sensitivity data gets updated in response to detecting a revision or copying of a downloaded document at the endpoint, after the download. File system monitor 122A detects revision or copying of a downloaded document after download 702 based on changes to the file system 614A (e.g., by intercepting file edit system calls, file revision system calls, file copy system calls), and the document classifier 652A attaches the sensitivity metadata label from the downloaded document to the revised or copied document 712, including attaching the label identifying the sensitive cloud-based service 608 as the source of the sensitive data, and updates local metadata store 134A with the attached label 715. In one example, the disclosed technology includes correlating activity on the network with activity on the application level: the data store at the network level knows that there is a connection to a human resources (HR) application, and revising or copying of the document can include sensitive data because the document source is the HR application.

Continuing with the description of FIG. 7, the endpoint policy enforcer 132A also reevaluates the sensitivity of the revised or copied document in response to detecting a revision or copying of a downloaded document after the download, generating sensitivity metadata that labels the revised or copied document as sensitive, and updating local metadata and document data store 134A with the sensitivity metadata generated for the revised or copied document. That is, endpoint policy enforcer 132A invokes DLP service for confirmatory classification of the revised or copied document 768 and updates local metadata store 134A to include the sensitivity metadata 774 with the confirmatory sensitivity classification. The DLP metadata for the sensitive file gets stored 778 in cloud-based metadata data store 185 for future DLP policy enforcement 782.

Having described the cloud-based implementations, the discussion now turns to on-premise implementations.

On-Premise Environment

Figure 8:
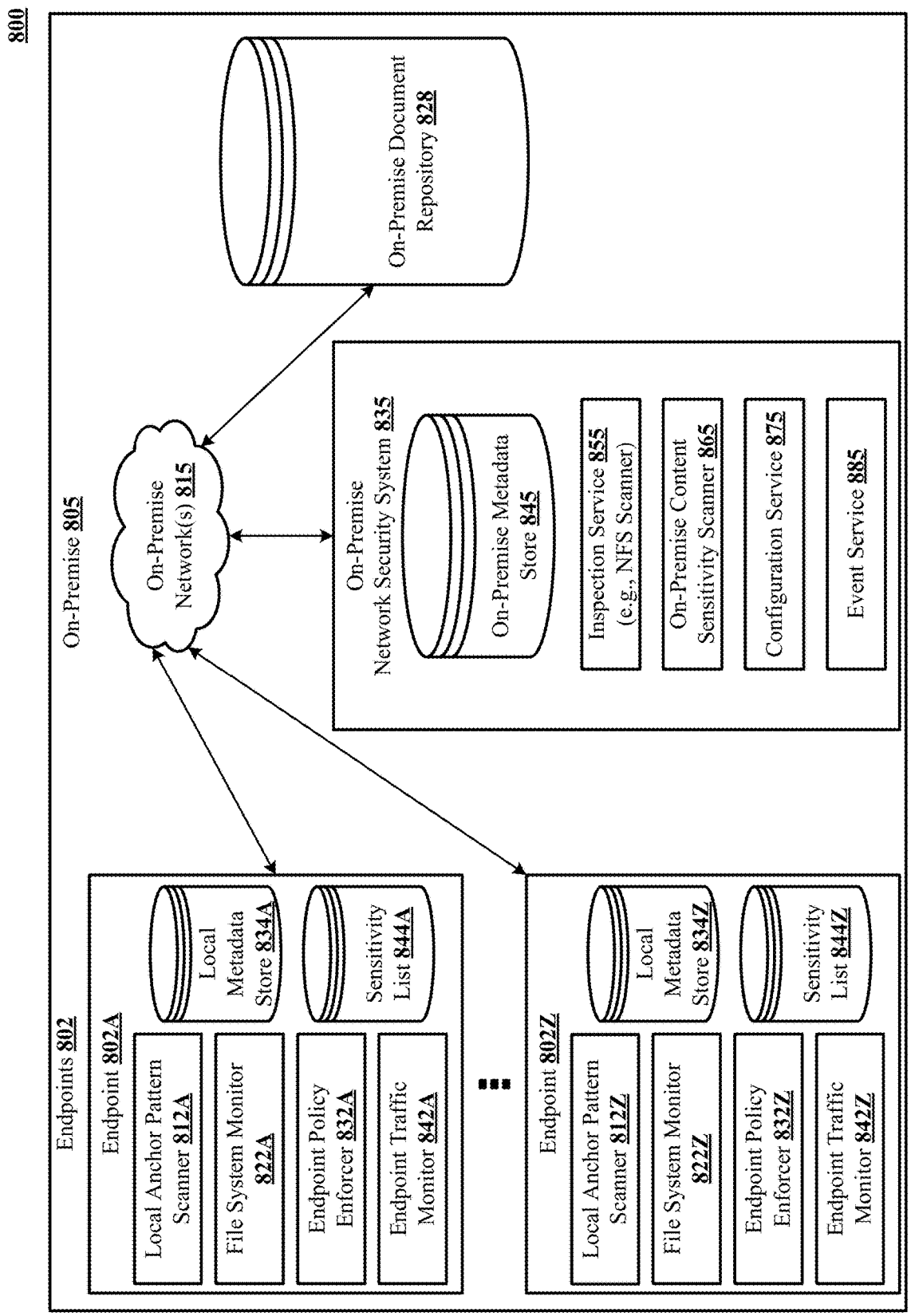
FIG. 8 depicts one implementation of the technology disclosed operating in an on-premise environment.

FIG. 8 depicts one implementation of the technology disclosed operating in an on-premise environment 800. Implementations discussed above with respect to the cloud-based environment 100 using FIGS. 1-7 apply analogously to the on-premise environment 800 with certain differences; key among them being that the documents are stored in an on-premise document repository 828 (e.g., network mounted file servers) rather than on the cloud-based services 128, endpoints 802A-Z being on-premise 805 under the purview of the on-premise network(s) 815 rather than being capable of operating remotely through the public network(s) 115, communications between the endpoints 802A-Z and the on-premise document repository 828 being modulated by an on-premise network security system 835 rather than by the cloud-based network security system 135, the sensitive metadata being proactively stored on an on-premise metadata store 845 rather than on the cloud-based metadata store 145, the inspection service 855 using network file system scanners to interface and crawl the on-premise document repository 828, and the sensitivity scan being performed by the on-premise content sensitivity scanner 865.

Wherever practicable, certain elements in FIG. 8 such as endpoints 802A-Z, local anchor pattern scanners 812A-Z, file system monitors 822A-Z, endpoint policy enforcers 832A-Z, endpoint traffic monitors 842A-Z, local metadata stores 834A-Z, sensitivity lists 844A-Z, inspection service 855, on-premise content sensitivity scanner 865, configuration service 875, and event service 885 indicate functionality similar to or like the corresponding elements in FIGS. 1-7.

Computer System

Figure 9:
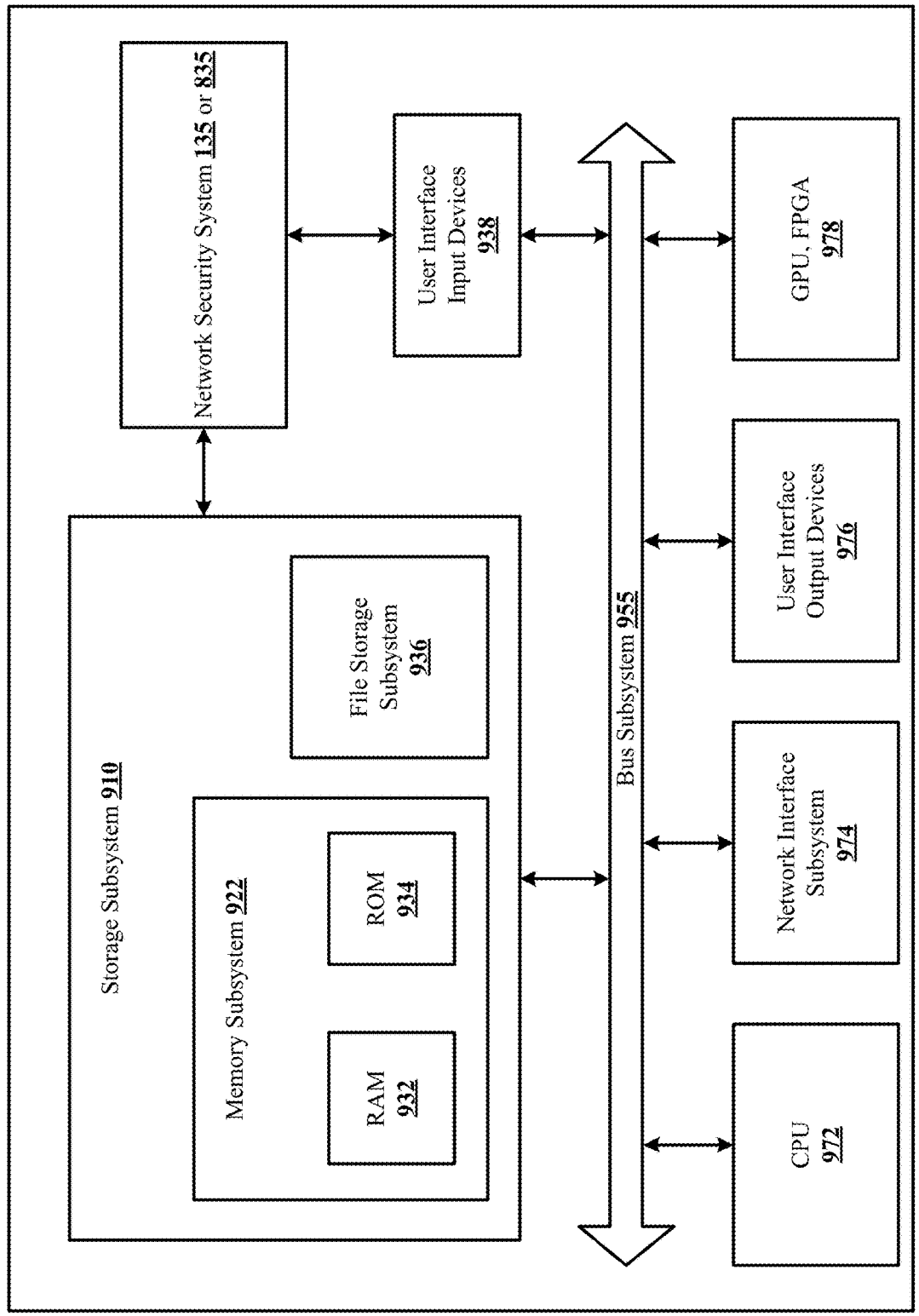
FIG. 9 is a simplified block diagram of a computer system that can be used to implement the technology disclosed.

FIG. 9 is a simplified block diagram of a computer system 900 that can be used to implement the technology disclosed. Computer system 900 includes at least one central processing unit (CPU) 972 that communicates with a number of peripheral devices via bus subsystem 955. These peripheral devices can include a storage subsystem 910 including, for example, memory devices and a file storage subsystem 936, user interface input devices 938, user interface output devices 976, and a network interface subsystem 974. The input and output devices allow user interaction with computer system 900. Network interface subsystem 974 provides an interface to outside networks, including an interface to corresponding interface devices in other computer systems.

In one implementation, the cloud-based network security system (NSS) 135 of FIG. 1 or the on-premise network security system (NSS) 835 of FIG. 8 are communicably linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. Subsystem 978 can be graphics processing units (GPUs) or field-programmable gate arrays (FPGAs).

Memory subsystem 922 used in the storage subsystem 910 can include a number of memories including a main random access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 910, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or less components than the computer system depicted in FIG. 9.

Particular Implementations

The technology disclosed relates to enforcing data loss prevention policies at an endpoint without needing to perform content sensitivity scan at the endpoint. Some particular implementations and features are described in the following discussion.

Small-Footprint Endpoint Data Loss Prevention (Sf-EDLP)

In one implementation, a disclosed computer-implemented method of enforcing data loss prevention policies at an endpoint without needing to perform sensitivity scan at the endpoint includes receiving, at an endpoint policy enforcer running on the endpoint, data egress requests to push data in documents from the endpoint to uncontrolled locations; and the endpoint policy enforcer having access to a cloud-based metadata store that includes sensitivity metadata previously generated in advance of the requests to classify the documents as sensitive or non-sensitive based on deep inspection of the documents. The disclosed method also includes, in response to receiving a data egress request for a document, the endpoint policy enforcer determining sensitivity of the document by retrieving the sensitivity metadata for the document from the cloud-based metadata store; and the endpoint policy enforcer enforcing a data loss prevention policy at the endpoint based on the retrieved sensitivity metadata and without performing a sensitivity scan of the document at the endpoint.

This method and other implementations of the technology disclosed can include one or more of the following features and/or features described in connection with additional methods disclosed. In the interest of conciseness, the combinations of features disclosed in this application are not individually enumerated and are not repeated with each base set of features.

In some implementations, the disclosed computer-implemented method further includes determining that the retrieved sensitivity metadata identifies the document as sensitive and blocking the data egress request. In other implementations, another security action, including asking the user for justification for making the data egress requests.

Some implementations of the disclosed computer-implemented method further include determining that the retrieved sensitivity metadata identifies the document as non-sensitive and allowing fulfillment of the data egress request.

In one implementation of the disclosed computer-implemented method, the sensitivity metadata further includes data that was generated by an inspection service that inspected the documents while the documents were resident in a cloud-based document store.

For another implementation of the disclosed method, the sensitivity metadata further includes data that was generated by an inspection service that inspected the documents while the documents were in transit to or from a cloud-based document store.

In yet another implementation of the disclosed method, the sensitivity metadata includes data that was generated by an inspection service that inspected the documents while the documents were resident in a mounted file system. In some disclosed implementations, the endpoint policy enforcer first retrieves the sensitivity metadata for the document from the local metadata store and, if no sensitivity metadata is available for the document in the local metadata store, retrieves the sensitivity metadata from the cloud-based metadata store. The disclosed method can further include, when no sensitivity metadata is available for the document, the endpoint policy enforcer invoking a local anchor pattern scanner running on the endpoint that preliminarily classifies the document as sensitive or non-sensitive based on anchor pattern check; sends the document that scored positive on the anchor pattern check to a cloud-based content sensitivity scanner that confirmatory classifies the document as sensitive or non-sensitive based on deep inspection; and receives sensitivity metadata identifying the confirmatory sensitivity classification. When the local anchor pattern scanner preliminarily classifies the document as non-sensitive based on the anchor pattern check, the endpoint policy enforcer allows fulfillment of the data egress request. The disclosed method further includes updating the local metadata store to include the sensitivity metadata that identifies the confirmatory sensitivity classification for further data loss prevention policy enforcement at the endpoint. Some implementations of the disclosed method also include keeping the data egress request on hold until the confirmatory sensitivity classification is received. Some implementations further include the endpoint policy enforcer invoking the local anchor pattern scanner for sensitivity classification of uninspected documents added to the endpoint and updating the local metadata store to identify the sensitivity classification of the uninspected documents for further data loss prevention policy enforcement at the endpoint.

Some implementations of the disclosed method include the endpoint policy enforcer having access to a local metadata store of the sensitivity metadata at the endpoint that is periodically synchronized with the cloud-based metadata store. In a case in which the on-premises local system is offline, and data egress requests to push data in documents from the endpoint to uncontrolled locations are received, the endpoint policy enforcer has access to a local metadata store that includes sensitivity metadata previously generated in advance of the requests to classify the documents as sensitive or non-sensitive based on deep inspection of the documents. In this case, in response to receiving a data egress request for a document, the endpoint policy enforcer determines sensitivity of the document by retrieving the sensitivity metadata for the document from the local metadata store; and the endpoint policy enforcer enforces a data loss prevention policy at the endpoint based on the retrieved sensitivity metadata and without performing a sensitivity scan of the document at the endpoint. In another case, the endpoint policy enforcer enforces a configurable exception data loss prevention policy for always blocking or always allowing egress. In yet another case, the endpoint policy enforcer enforces encryption of sensitive data when endpoint actions are requested when the system is offline. In a further case, when sensitivity data is not available Information Rights Management (IRM) can be applied to sensitive data when endpoint actions are requested when the on premises system is offline.

One implementation of a disclosed computer-implemented method of controlling exfiltration of data in documents via endpoints, includes, in response to detecting data egress events at the endpoints that would push the data in the documents from the endpoints to uncontrolled locations, accessing a cloud-based metadata store and retrieving sensitivity metadata previously generated in advance of the data egress events to classify the documents as sensitive or not sensitive based on deep inspection of the documents; and enforcing data loss prevention policies at the endpoints based on the retrieved sensitivity metadata and without scanning the documents at the endpoint for sensitivity.

In one implementation, a disclosed device for enforcing data loss prevention policies at an endpoint, the device comprises a local metadata store maintained at the endpoint and configured to periodically receive from a cloud-based metadata store sensitivity metadata previously generated to classify documents as sensitive or non-sensitive based on deep inspection of the documents; a local anchor pattern scanner running on the endpoint and configured to preliminarily classify the documents as sensitive or non-sensitive based on anchor pattern check, to send the documents that scored positive on the anchor pattern check to a cloud-based sensitivity scanner that confirmatory classifies the documents as sensitive or non-sensitive based on deep inspection, and to receive sensitivity metadata identifying the confirmatory sensitivity classification; and an endpoint policy enforcer running on the endpoint and configured to respond to data egress requests that would push data in the documents from the endpoint to uncontrolled locations based on sensitivity of the documents determined by a look up of the local metadata store, followed by a look up of the cloud-based metadata store for documents not identified in the look up of the local metadata store, followed by preliminary sensitivity classification by the local anchor pattern scanner of documents not identified in the look ups of the local metadata store and the cloud-based metadata store, and followed by confirmatory sensitivity classification by the cloud-based sensitivity scanner of documents that scored positive on the anchor pattern check.

De Novo Sensitivity Metadata Generation

In another implementation, a disclosed computer-implemented method of enforcing data loss prevention policies at an endpoint without needing to perform sensitivity scan at the endpoint or on server-side includes combining network traffic monitoring of user interaction with cloud-based services identified as sensitive with file system monitoring of document download to the endpoint from the sensitive cloud-based services. The method also includes the combination of the network traffic monitoring and the file system monitoring generating sensitivity metadata that labels documents downloaded to the endpoint from the sensitive cloud-based services as sensitive and persisting the sensitivity metadata in a local metadata store at the endpoint. Further, in response to detecting data egress events at the endpoint that would push data in a document from the endpoint to uncontrolled locations, determining that the document is sensitive based on looking up the sensitivity metadata for the document in the local metadata store and without scanning the document at the endpoint for sensitivity; and enforcing a data loss prevention policy at the endpoint based on the determination. In some cases, the sensitivity metadata further labels the sensitive cloud-based services as a source of the documents downloaded at the endpoint. The disclosed method further includes, in response to detecting a revision or copying of a downloaded document after the download, attaching the sensitivity metadata label from the downloaded document to the revised or copied document, including attaching the label identifying the sensitive cloud-based services as the source and updating the local metadata store with the attachment. In one case, a revised document can be a document changed from a computer aided design (CAD) file to a PDF, or a spreadsheet saved as a PDF, or other documents generated from a parent sensitive document.

One implementation of the disclosed method further includes, in response to detecting a revision or copying of a downloaded document after the download, reevaluating sensitivity of the revised or copied document, generating sensitivity metadata that labels the revised or copied document as sensitive, and updating the local metadata store with the sensitivity metadata generated for the revised or copied document. The disclosed method can further include, in response to detecting data egress events at the endpoint that would push data in the revised or copied document from the endpoint to uncontrolled locations, determining that the revised or copied document is sensitive based on looking up the sensitivity metadata for the revised or copied document in the local metadata store and without scanning the revised or copied document at the endpoint for sensitivity; and enforcing a data loss prevention policy at the endpoint based on the determination. In some cases, the disclosed method further includes embedding the sensitivity metadata in the downloaded documents.

Another implementation of the disclosed computer-implemented method includes, in response to detecting data egress events at the endpoint that would push data in a document from the endpoint to uncontrolled locations, determining that the document is sensitive based on the sensitivity metadata embedded in the document and without scanning the document at the endpoint for sensitivity; and enforcing a data loss prevention policy at the endpoint based on the determination.

In other implementations, a combination of the endpoint traffic monitor and the file system monitor can interpret file system calls issued on common protocols used for transferring files like SMB, NFS, FTP, HTTP, and HTTPS. They can identify and store the origin from which a file has been written, such as a mounted drive (e.g., NFS, SMB) on the network, a mount point on the file system, or a domain name of a server. In one implementation, they can identify and store the original file type or format of a file as inheritance metadata. A child file, saved with a different file type or format than a parent file, inherits a subset of the parent file's metadata in the form of inheritance metadata. Put together, the origin can identify information a data source, a parent file, a user, or a user group. In yet other implementations, when a file or document is locally created on an endpoint, the decision to run a DLP scan on such a file can be conditional on the origin of the file and whether the origin is sensitive.

A disclosed implementation of a device for enforcing data loss prevention policies at an endpoint without needing to perform sensitivity scan at the endpoint comprises an endpoint policy enforcer running on the endpoint that receives data egress requests to push data in documents from the endpoint to uncontrolled locations; has access to a cloud-based metadata store which includes sensitivity metadata previously generated in advance of the requests to classify the documents as sensitive or non-sensitive based on deep inspection of the documents; responds to a data egress request for a document by determining sensitivity of the document based on looking up the sensitivity metadata for the document in the cloud-based metadata store and without performing a sensitivity scan of the document at the endpoint; and enforces a data loss prevention policy at the endpoint based on the determination.

In another implementation, a disclosed system includes one or more processors coupled to memory, the memory impressed with computer instructions, the instructions, when executed on the processors, implement actions of the disclosed methods described supra.

In yet another implementation a disclosed tangible non-transitory computer readable storage medium impressed with computer program instructions that, when executed on a processor, implement the disclosed methods described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A system including one or more processors coupled to memory, the memory loaded with computer instructions to enforce data loss prevention (DLP) policies at an endpoint without needing to perform content sensitivity scan at the endpoint or on server-side, the instructions, when executed on the processors, implement actions comprising:
   an endpoint traffic monitor that performs network traffic monitoring by parsing requests directed toward cloud-based services to determine that the requested cloud-based services are those that are previously identified as sensitive cloud-based services;
   a file system monitor that performs file system monitoring by detecting write system calls issued by a file system driver of the endpoint to determine download of one or more documents to the endpoint from the sensitive cloud-based services;
   a document classifier that labels the documents as sensitive based on a combination of
      the inference from the network traffic monitoring that the documents originated from the sensitive cloud-based services, and the inference from the file system monitoring that the documents were downloaded to the endpoint;

a local metadata store at the endpoint that stores the sensitivity labels for the documents as sensitivity metadata; and an endpoint policy enforcer which, in response to detecting data egress events at the endpoint that would push data in a document from the endpoint to uncontrolled locations, determines that the document is sensitive based on looking up the sensitivity metadata for the document in the local metadata store and without scanning the document at the endpoint for sensitivity, and enforces a DLP policy at the endpoint based on the determination.

2. A system including one or more processors coupled to memory, the memory loaded with computer instructions to enforce data loss prevention (DLP) policies at an endpoint without needing to perform content sensitivity scan at the endpoint or on server-side, the instructions, when executed on the processors, implement actions comprising:

an endpoint traffic monitor that performs network traffic monitoring by parsing requests directed toward cloud-based services to determine that the requested cloud-based services are those that are previously identified as sensitive cloud-based services;

a file system monitor that performs file system monitoring by detecting write system calls issued by a file system driver of the endpoint to determine download of one or more documents to the endpoint from the sensitive cloud-based services;

a document classifier that labels the documents as sensitive based on a combination of the inference from the network traffic monitoring that the documents originated from the sensitive cloud-based services, and the inference from the file system monitoring that the documents were downloaded to the endpoint; and wherein the sensitivity labels for the documents are stored as sensitivity metadata and used by an endpoint policy enforcer for responding to data egress requests and endpoint DLP policy enforcement in future without scanning the documents at the endpoint for sensitivity.

3. The system of claim 2, wherein the sensitivity metadata is stored in a local metadata store at the endpoint.

4. The system of claim 3, wherein the sensitivity metadata further labels the sensitive cloud-based services as a source of the documents downloaded at the endpoint; and implementing actions further comprising, in response to detecting a revision or copying of a downloaded document after the download, attaching the sensitivity metadata label from the downloaded document to the revised or copied document, including attaching the sensitivity metadata label identifying the sensitive cloud-based services as the source and updating the local metadata store with the attachment.

5. The system of claim 4, implementing actions further comprising, in response to detecting a revision or copying of a downloaded document after the download, reevaluating sensitivity of the revised or copied document, generating sensitivity metadata that labels the revised or copied document as sensitive, and updating the local metadata store with the sensitivity metadata generated for the revised or copied document.

6. The system of claim 5, implementing actions further comprising embedding the sensitivity metadata in the downloaded documents.

7. The system of claim 1, wherein the sensitive cloud-based services are previously identified based on their functionality and sensitive nature of data they store.

8. The system of claim 7, wherein the sensitive cloud-based services are identified in at least one sensitivity list stored at the endpoint.

9. The system of claim 8, wherein the sensitive cloud-based services are identified based on their respective unified resource locators (URLs).

10. A computer-implemented method of enforcing data loss prevention policies at an endpoint without needing to perform content sensitivity scan at the endpoint or on server-side, the method including:

combining network traffic monitoring of user interaction with cloud-based services identified as sensitive with file system monitoring of document download to the endpoint from the sensitive cloud-based services;

the combination of the network traffic monitoring and the file system monitoring generating sensitivity metadata that labels documents downloaded to the endpoint from the sensitive cloud-based services as sensitive and persisting the sensitivity metadata in a local metadata store at the endpoint; and in response to detecting data egress events at the endpoint that would push data in a document from the endpoint to uncontrolled locations, determining that the document is sensitive based on looking up the sensitivity metadata for the document in the local metadata store and without scanning the document at the endpoint for sensitivity; and enforcing a data loss prevention policy at the endpoint based on the determination.

11. The computer-implemented method of claim 10, wherein the sensitivity metadata further labels the sensitive cloud-based services as a source of the documents downloaded at the endpoint; and further including, in response to detecting a revision or copying of a downloaded document after the download, attaching the sensitivity metadata label from the downloaded document to the revised or copied document, including attaching the sensitivity metadata label identifying the sensitive cloud-based services as the source and updating the local metadata store with the attachment.

12. The computer-implemented method of claim 11, further including, in response to detecting a revision or copying of a downloaded document after the download, reevaluating sensitivity of the revised or copied document, generating sensitivity metadata that labels the revised or copied document as sensitive, and updating the local metadata store with the sensitivity metadata generated for the revised or copied document.

13. The computer-implemented method of claim 10, further including embedding the sensitivity metadata in the downloaded documents.

14. The computer-implemented method of claim 10, wherein the sensitive cloud-based services are identified based on their functionality and sensitive nature of data they store.

15. The computer-implemented method of claim 14, wherein the sensitive cloud-based services are identified in at least one sensitivity list stored at the endpoint.

16. The computer-implemented method of claim 15, wherein the sensitive cloud-based services are identified based on their respective unified resource locators (URLs).

17. A non-transitory computer readable storage medium impressed with computer program instructions to enforce data loss prevention policies at an endpoint without needing to perform content sensitivity scan at the endpoint or on server-side, the instructions, when executed on a processor, implement a method comprising:

combining network traffic monitoring of user interaction with cloud-based services identified as sensitive with file system monitoring of document download to the endpoint from the sensitive cloud-based services;

the combination of the network traffic monitoring and the file system monitoring generating sensitivity metadata that labels documents downloaded to the endpoint from the sensitive cloud-based services as sensitive and persisting the sensitivity metadata in a local metadata store at the endpoint; and in response to detecting data egress events at the endpoint that would push data in a document from the endpoint to uncontrolled locations, determining that the document is sensitive based on looking up the sensitivity metadata for the document in the local metadata store and without scanning the document at the endpoint for sensitivity; and enforcing a data loss prevention policy at the endpoint based on the determination.

18. The non-transitory computer readable storage medium of claim 17, wherein the sensitivity metadata further labels the sensitive cloud-based services as a source of the documents downloaded at the endpoint; and implementing the method further comprising, in response to detecting a revision or copying of a downloaded document after the download, attaching the sensitivity metadata label from the downloaded document to the revised or copied document, including attaching the sensitivity metadata label identifying the sensitive cloud-based services as the source and updating the local metadata store with the attachment.

19. The non-transitory computer readable storage medium of claim 18, implementing the method further comprising, in response to detecting a revision or copying of a downloaded document after the download, reevaluating sensitivity of the revised or copied document, generating sensitivity metadata that labels the revised or copied document as sensitive, and updating the local metadata store with the sensitivity metadata generated for the revised or copied document.

20. The non-transitory computer readable storage medium of claim 19, implementing the method further comprising embedding the sensitivity metadata in the downloaded documents.

* * * * *